(12) United States Patent
Pelloin

(10) Patent No.: US 11,416,504 B2
(45) Date of Patent: Aug. 16, 2022

(54) DETECTION, CHARACTERIZATION, AND PREDICTION OF REAL-TIME EVENTS OCCURRING APPROXIMATELY PERIODICALLY

(71) Applicant: EXFO Solutions SAS, Saint-Jacques-de-la-Lande (FR)

(72) Inventor: Fabrice Pelloin, Rennes (FR)

(73) Assignee: EXFO Solutions SAS, Saint-Jacques-de (FR)

( * ) Notice: Subject to any disclaimer, the term of this patent is extended or adjusted under 35 U.S.C. 154(b) by 0 days.

(21) Appl. No.: 17/169,735

(22) Filed: Feb. 8, 2021

(65) Prior Publication Data

US 2021/0248138 A1    Aug. 12, 2021

Related U.S. Application Data

(60) Provisional application No. 63/065,883, filed on Aug. 14, 2020, provisional application No. 62/975,364, filed on Feb. 12, 2020.

(51) Int. Cl.
*G06F 16/2458* (2019.01)
*G06F 16/2457* (2019.01)
(Continued)

(52) U.S. Cl.
CPC ........ *G06F 16/2465* (2019.01); *G06F 16/243* (2019.01); *G06F 16/244* (2019.01);
(Continued)

(58) Field of Classification Search
CPC ............... G06F 16/2465; G06F 16/243; G06F 16/24573; G06F 16/244; G06F 16/24575; G06F 16/248; G06N 20/00
See application file for complete search history.

(56) References Cited

U.S. PATENT DOCUMENTS 7,363,656 B2   4/2008  Weber et al.
8,887,286 B2   11/2014 Dupont et al.
(Continued)

FOREIGN PATENT DOCUMENTS

WO    2017172541 A1    10/2017

OTHER PUBLICATIONS

Sheng MA and J. L. Hellerstein, "Mining partially periodic event patterns with unknown periods," Proceedings 17th International Conference on Data Engineering, Heidelberg, Germany, 2001, pp. 205-214, doi: 10.1109/ICDE.2001.914829., [Retrieved on Mar. 5, 2020], Retrieved from the Internet <URL: https://ieeexplore.ieee.org/document/914829>.

(Continued)

*Primary Examiner* — Kannan Shanmugasundaram
(74) *Attorney, Agent, or Firm* — Clements Bernard Baratta; Lawrence A. Baratta, Jr.

(57) ABSTRACT

Systems and methods for detection, characterization, and prediction of real-time events having approximate periodicity include detection of events from raw data that are approximately periodic. The detection includes analyzing raw data to determine approximately periodic chains of events. The raw data can be related to network management systems, financial monitoring systems, medical monitoring, seismic activity monitoring, or any system that performs some management or monitoring of an underlying system or network having time lasting events. The detected approximately periodic events could be characterized and presented in natural language as well as used for prediction of future events via supervised machine learning.

17 Claims, 12 Drawing Sheets

(51) Int. Cl.
*G06N 20/00* (2019.01)
*G06F 16/248* (2019.01)
*G06F 16/242* (2019.01)

(52) U.S. Cl.
CPC ...... *G06F 16/248* (2019.01); *G06F 16/24573* (2019.01); *G06F 16/24575* (2019.01); *G06N 20/00* (2019.01)

(56) References Cited

U.S. PATENT DOCUMENTS

| | | | |
|---|---|---|---|
| 9,680,909 | B2 | 6/2017 | Hoshing et al. |
| 10,061,632 | B2 | 8/2018 | Ben Simhon et al. |
| 10,061,677 | B2 | 8/2018 | Toledano |
| 10,193,901 | B2 | 1/2019 | Muddu et al. |
| 10,686,681 | B2 | 6/2020 | Medas et al. |
| 10,891,558 | B2 | 1/2021 | Ben Simhon et al. |
| 11,030,032 | B2 | 6/2021 | Ben Simhon et al. |
| 11,341,019 | B2 | 5/2022 | Toledano |
| 2007/0276631 | A1* | 11/2007 | Subramanian ........ G06F 11/008 707/999.107 |
| 2010/0185414 | A1 | 7/2010 | Yamamoto et al. |
| 2012/0137367 | A1 | 5/2012 | Dupont et al. |
| 2016/0019460 | A1* | 1/2016 | Li .................... G06F 16/24578 719/318 |
| 2016/0103838 | A1 | 4/2016 | Sainani et al. |
| 2018/0365090 | A1 | 12/2018 | Ben Simhon et al. |
| 2019/0114041 | A1* | 4/2019 | Pitkänen ................. G06F 16/26 |
| 2019/0260764 | A1 | 8/2019 | Humphrey et al. |
| 2020/0233774 | A1 | 7/2020 | Toledano |
| 2021/0089917 | A1 | 3/2021 | Simhon et al. |

OTHER PUBLICATIONS

Zhao et al., KronoMiner: Using Multi-Foci Navigation for the Visual Exploration of Time-Series Data, CHI 2011. Session : Visual Analytics, May 7-12, 2011, pp. 1737-1746, [Retrieved on Mar. 5, 2020] Retrieved from the Internet: <URL: http://www.dgp.utoronto.ca/~ravin/papers/chi2011_kronominer.pdf>.

Zhang et al., An Observation-Centric Analysis on the Modeling of Anomaly-based Intrusion Detection, International Journal of Network Security, vol. 4, No. 3, pp. 292-305, May 2007, [Retrieved on Mar. 5, 2020] Retrieved from the Internet <URL: https://pdfs.semanticscholar.org/9b9c/1487c2cf5134fe3f1e8557294f66d7690ad6.pdf>.

Elfeky et al., Periodicity Detection in Time Series Databases, Department of Computer Science Technical Reports, Purdue University, Dec. 2002, Purdue e-Pubs, 02-029, Paper 1547, 12 pages. [Retrieved on Mar. 5, 2020] Retrieved from the Internet <URL: https://docs.lib.purdue.edu/cgi/viewcontent.cgi?article=2546&context=cstech>.

Jun. 8, 2021, Extended European Search Report for European Application No. EP 21 15 6195.

* cited by examiner

DETECTION, CHARACTERIZATION, AND PREDICTION OF REAL-TIME EVENTS OCCURRING APPROXIMATELY PERIODICALLY

CROSS-REFERENCE TO RELATED APPLICATION(S)

The present disclosure relates to U.S. Provisional Patent Application No. 62/975,364, filed Feb. 12, 2020, and U.S. Provisional Patent Application No. 63/065,883, filed Aug. 14, 2020 the contents of each are incorporated by reference in their entirety.

FIELD OF THE DISCLOSURE

The present disclosure generally relates to network monitoring. More particularly, the present disclosure relates to systems and methods for detection, characterization, and prediction of real-time events occurring periodically.

BACKGROUND OF THE DISCLOSURE

Various management and monitoring systems produce a large amount of real-time data that is simply too much for a user to comprehend or efficiently process without significant expertise. As described herein, the management and monitoring systems may include network management systems, financial monitoring systems, medical monitoring, seismic activity monitoring, or any system that performs some management or monitoring of an underlying system or network having time lasting events that have associated severity, urgency, and/or impact on end users. The real-time data may include telemetry data, alarms, warnings, Performance Monitoring (PM) data, event information, transaction information, metrics, Key Performance Indicators (KPIs), Call Detail Records (CDR), etc. The general objective of management and monitoring systems is for users (e.g., operators, technicians, etc.) to detect service interruption or issues, investigate such service interruption or issues, and provide remediation. Of course, the objective is to simplify the investigation, identify and prioritize events, and utilize resources effectively.

The amount of data any system or network generates far exceeds the amount a human user can process. It would be advantageous to extract information from this data and present it to the user in an easy and digestible manner. In networking, for example, there are various network management techniques for providing information about alarms and network events. However, these conventional techniques typically require expertise from the operators, do not provide high-level insights, and are not helpful in the context of service assurance, e.g., remediating issues based on their underlying impact on users.

In conventional systems and methods, there are simply too many events to report and too much information about these events that come in sporadically. This presents a challenge to provide this information to allow the technician to select the right priority for each event. There is a need for improvements in detection, characterization, and prediction of time lasting events.

Real-time anomalies can be detected in the data using counters and KPIs linked to telecommunications network health. However, the anomalies are typically triggered by rules which are manually configured by experts. Reported information can include start time, end time, rule type, severity, impacted subscribers, impacted dimensions, auto-diagnostics results of the case, etc.

Experts have noticed that some of these cases may be periodic or approximately periodic, for different reasons, such as recurrent scheduled tasks or events on the network that create issues or network usage and overload at certain days/hours of a week. Sometimes, the reason can be identified because related counters are linked to the number of simultaneous calls and locations (e.g., a simple example would be a sporting event and traffic at the stadium at the times of the event). Periodicities may evolve over time. As described herein, a periodic event is one that occurs at a certain day and/or time over a certain period (time interval). An approximately periodic event is one that is almost periodic, e.g., one that occurs on identifiable days at about the same time in a manner that can be predicted in the future.

One advantage of being able to identify and remediate approximately periodic events is this can prevent future issues (outages). For now, the typical user has no easy way to detect approximate periodicities in the conventional systems unless a pre-determined and fixed rule has been hard-coded by an expert. There is a need for an adaptive system that can detect periodicities in real-time data for use in issue identification.

BRIEF SUMMARY OF THE DISCLOSURE

The present disclosure relates to systems and methods for detection, characterization, and prediction of real-time events having approximate periodicity. Specifically, the present disclosure can include detection of events from raw data that are approximately periodic, characterization of the periodicity of the events, and prediction of future events via supervised machine learning. The detection includes analyzing raw data to determine approximately periodic chains of events. The characterization includes analyzing the almost periodic of the events to transform the detection into natural language for a human user. Finally, the prediction includes a model trained via supervised learning that can be used in production to detect future events from real-time data. The detection, characterization, and prediction can be used individually or in combination with one another. The raw data can be related to network management systems, financial monitoring systems, medical monitoring, seismic activity monitoring, or any system that performs some management or monitoring of an underlying system or network having time lasting events.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various embodiments, the present disclosure relates to systems and methods for detection, characterization, and prediction of real-time events having approximate periodicity. Specifically, the present disclosure can include detection of events from raw data that are approximately periodic, characterization of the periodicity of the events, and prediction of future events via supervised machine learning. The detection includes analyzing raw data to determine almost periodic events. The characterization includes analyzing the almost periodic of the events to transform the detection into natural language for a human user. Finally, the prediction includes a model trained via supervised learning that can be used in production to detect future events from real-time data. The detection, characterization, and prediction can be used individually or in combination with one another. The raw data can be related to network management systems, financial monitoring systems, medical monitoring, seismic activity monitoring, or any system that performs some management or monitoring of an underlying system or network having time lasting events.

For illustration purposes, the present disclosure focuses on a network as an example use case. For example, the objective of the present disclosure is to identify almost periodic events, characterize the events for an operator to understand and predict future occurrences based on monitoring real-time data.

The purpose of the present disclosure is to fine periodicities or approximate periodicities in the occurrence of events, i.e., the underlying recurrence. Periodic events involved in a periodicity are called a chain of periodic events, or simply a chain. It is also important to note that the same event can be involved in several different periodic chains. During the duration of a periodic chain of events, several other events of the same type may occur (those events may or may not be involved in other periodic chains). So that periodic chains occurs around 'noisy' other events. This noise is an important matter to evaluate the periodicity 'strength.' Several discontinuous periodic chains of events can have the same 'time period.' In this case, it is important to analyze gaps between chains, and chains sizes, to see there is some pattern (see periodic recurrence pattern recognition described herein) that would be helpful for predictions. A periodic chain of occurrences can be found during a certain duration and disappear (periodic chains can be 'over' or 'ongoing'). An ongoing periodic chain may have additional bounded events in the future (after current real time).

System

Figure 1:
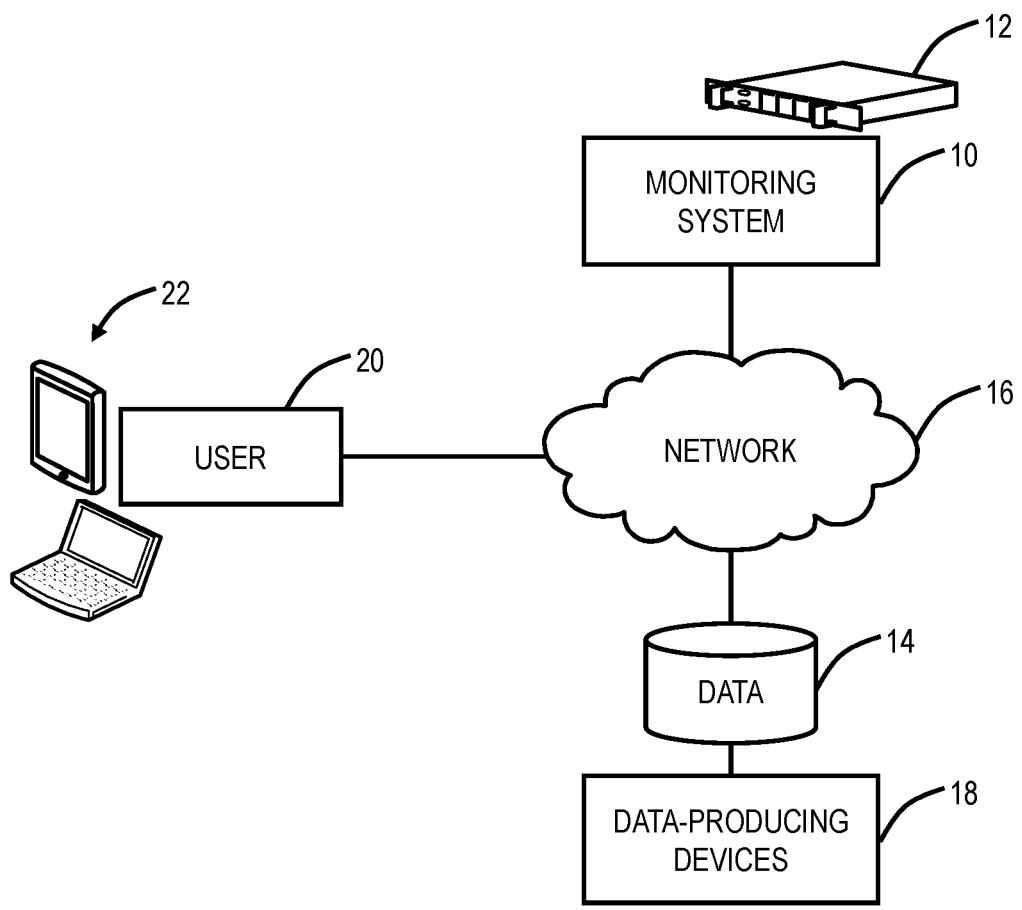
FIG. 1 is a block diagram of a monitoring system for implementing the systems and methods for detection, characterization, and prediction of real-time events having approximate periodicity.
Figure 11:
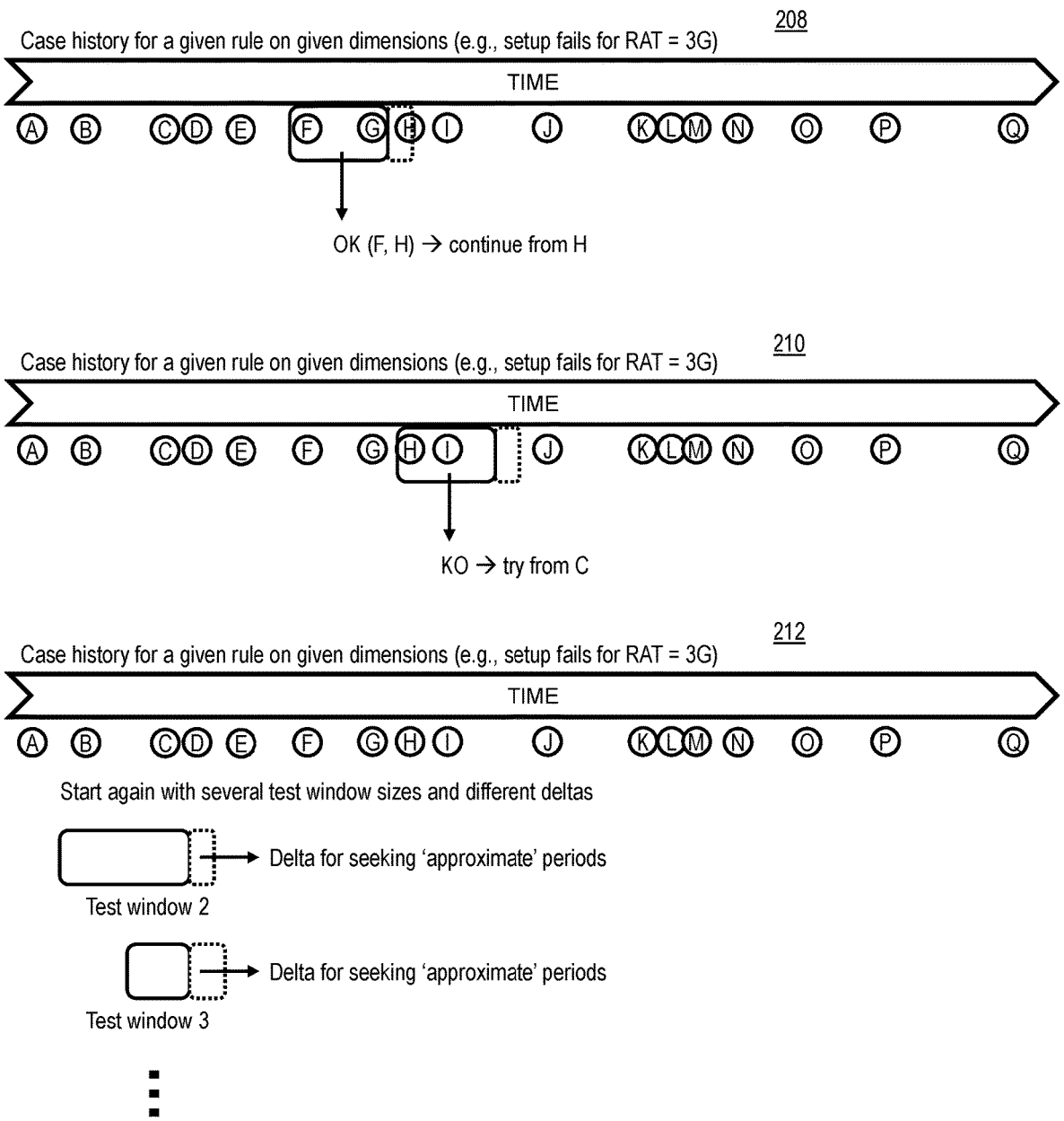

FIG. 1 is a block diagram of a monitoring system 10 for implementing the systems and methods for detection, characterization, and prediction of real-time events having approximate periodicity. The monitoring system 10 can be implemented on a server 12 (an embodiment of the server 12 is illustrated in FIG. 11), multiple servers 12, in the cloud, etc. The monitoring system 10 can be configured to obtain data 14, such as via a network 16, related to the operation of data-producing devices 18. The data 14 may be obtained from, without limitation, a Network Management System (NMS), an Element Management System (EMS), an Operations Support System (OSS), a Software-Defined Networking (SDN) controller, an SDN application, a database, one or more servers, etc. The network 16 may include the Internet, a Wide Area Network (WAN), a Local Area Network (LAN), a Virtual LAN (VLAN), and the like as well as combinations. The data 14 can be in a database or the like and obtained from various data-producing devices 18, which ultimately produce the data used by the monitoring system 10.

In a networking example, data-producing devices 18 may include network elements or nodes such as switches, routers, terminals, repeaters, aggregation devices, radio equipment, etc. That is, the network elements or nodes may include any devices in a network responsible for some aspect of data processing, switching, and/or transmission. In a financial monitoring example, the data-producing devices 18 may include servers responsible for financial processing. Again, the data from the data-producing devices 18 may include telemetry data, alarms, warnings, PM data, events, etc. This data can be real-time or near real-time (e.g., minutes old). In the networking example, PM data is usually provided real-time as well as in 15 minute and 24-hour increments. Further, alarms and warnings are provided immediately upon detection. Similarly, in the financial example, alarms and warnings can be provided immediately upon detection.

Figure 12:
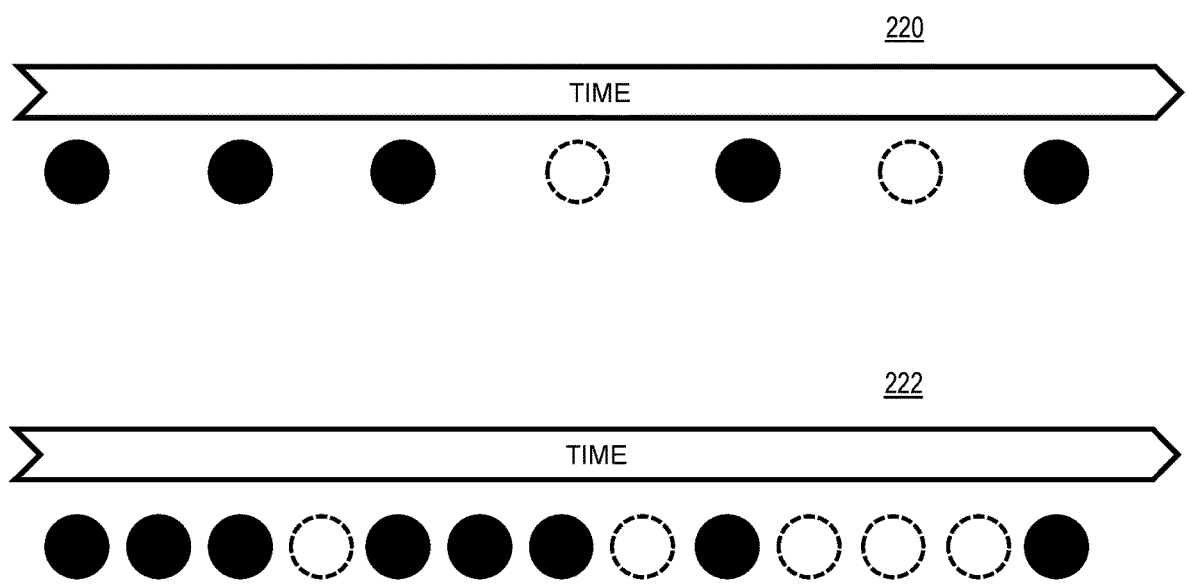
FIG. 12 is a diagram of a chain of events for illustrating missing occurrences

A user 20, via a user device 22 (an embodiment of the user device 22 is illustrated in FIG. 12), connects to the monitoring system 10 for the display of a Graphical User Interface (GUI) that includes a visualization of various aspects of the data 14. In an embodiment, the user device 22 may be in a Network Operations Center (NOC) or the like. The monitoring system 10 can provide a Web application to the user device 22 for interaction.

As described herein, the monitoring system 10 is illustrated with example usage in networking or financial monitoring, but those of ordinary skill in the art will recognize the present disclosure contemplates usage in any application where time lasting events occur having some periodicity. The monitoring system 10 is configured to obtain the data 14, process the data 14, detect periodicity in the data 14, characterize the periodicity in the data 14, and/or predict future events from a trained model.

Events

The data 14 includes events, each having a set of characteristics such as type, start time, end time, impact, duration, etc. Again, the data 14 can include telemetry data, alarms, warnings, PM data, events, OSS data, data from external feeds, etc. An event may represent some indication of abnormal activity in the data 14. As described herein, an event is something determined from the data 14 that has some impact and where there can be some remediation to minimize or remove the impact. In the networking example, this includes events where some end users (subscribers) are being impacted. In the financial example, this can include events where some accounts are uncollectable, past due, etc.

In the present disclosure, the monitoring system 10 is configured to obtain raw data, such as a real-time compilation of events, and perform the following functions:

a) Find events of the same type that are periodic and characterize the periodicity;

b) Optionally highlight the recurring events in the compilation;

c) Optionally provide a natural language description of the periodicity characteristics;

d) If the periodicity characteristics are strong enough, use them to predict a future event(s); and e) Optionally add the predicted event(s) to the compilation.

Periodicity

The following terminology is utilized herein. A periodic event is one that occurs at a set interval, e.g., a certain day and/or time over a certain period (time interval). For example, in a sporting example, a football game may occur every Sunday at 1 pm. The present disclosure relates to events that are approximately periodic. An approximately periodic event is one that is apparently or approximately periodic, e.g., one that occurs most of the time on identifiable days at about the same time. Of note, the present disclosure can also detect chains that are not linked to days or weeks (i.e., not seasonal). It can, for example, find a periodic chain of a 20-minute period that happens just once in a single day (and never after that). This chain has nothing to do with seasonal repetition, it can be a punctual network disfunction, for example.

The key with an approximately periodic event is that it is not exactly periodic, but periodic enough to derive some characteristic for an operator to perform some remedial action. For example, an event may occur every Monday, one week at 8:13 am, the next week at 8:17 am, etc. This is close, but not exact. Other terms for describing this periodicity include pseudo-periodicity (known mathematical term for oscillating signals), almost-periodicity (known mathematical term that is periodic to within any desired level of accuracy), etc. As described herein, the term approximate periodicity or approximately periodic is used, and this means an event has some interval where it repeats, and that interval may not be exact in both time of occurrence and date, but close enough to have some predictability. That is, some unexpected (few) lack of occurrences can occur, and this does not break the periodicity result. For time, the approximate periodicity or approximately periodic means the occurrence time may vary to within some level of accuracy (e.g., minutes, not hours). In an embodiment, the present disclosure can include aggregating data into time periods (e.g., 15 minutes). The approximate periodicity can then be found based on the time periods. Also, the time periods can be any amount of time, e.g., even weeks. The aggregating data into time periods can reduce the amount of input data and set the minimal precision of the approximate periodicity, i.e., the minimal precision is equal to the time period amount. For date, the event may be approximately periodic on a weekly basis but may skip a week here and there. Also, the intensity, e.g., the number of subscribers impacted, may vary on each occurrence. That is, the approximate periodicity or approximately periodic is similar to the almost-periodicity math concept, but it does not require every interval.

Approximate periodicity can be defined by the depth (time since when it has been characterized for the first time), continuity (does pattern shows missing occurrences? Too much discontinuity may lead to weak patterns that could be invalid), and recent continuity (same but reduced on last pattern occurrences). Approximate periodicity can also be defined by the number of consecutive items in a period chain, the period time precision (some periods can be exact, e.g., strictly 24 h or some may be less precise, e.g, between 3 h45 and 3 h55), and the period noise (ratio of similar type items on the period seek range that are not part of this period) that are part of the period (strength). These parameters help to show the periodicity 'strength' and are important statistics for machine learning process.

Overall Operation

Figure 2:
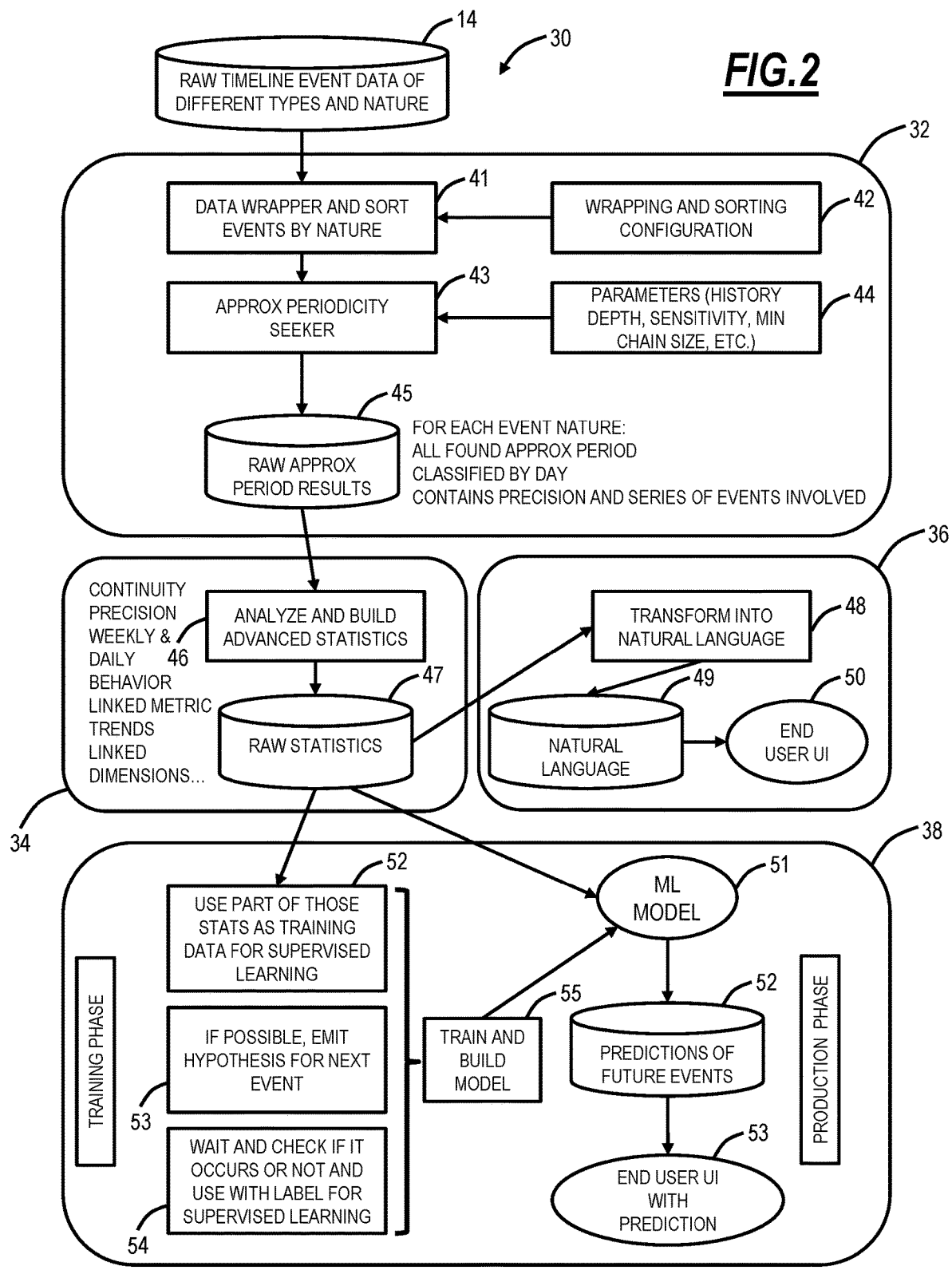
FIG. 2 is a flowchart of a process implemented by the monitoring system for the detection, characterization, and prediction of real-time events having approximate periodicity.

FIG. 2 is a flowchart of a process 30 implemented by the monitoring system 10 for the detection, characterization, and prediction of real-time events having approximate periodicity. The process 30 includes a detection phase 32, a monitoring phase 34, a characterization phase 36, and a prediction phase 38. Again, the present disclosure contemplates the phases 32, 34, 36, 38 being implemented individually as well as in combination with one another. The process 30 can be a computer-implemented method, implemented via the monitoring server 10, and/or as instructions executable by a processor or device embodied in a non-transitory computer-readable medium.

The process 30 begins with the data 14, which can be categorized as raw timeline event data of different types and nature. The detection phase 32 is configured to detect almost periodic events in the data 14, the monitoring phase 34 is configured to identify statistics associated with the almost periodic events, the characterization phase 36 is configured to label the almost periodic events in a meaningful manner (natural language), and the prediction phase 38 is configured to train a machine learning model and use the machine learning model to predict future events.

In the detection phase 32, the process 30 includes wrapping the data and sorting events by nature, i.e., formatting the data (step 41), based on a wrapping and sorting configuration 42. The data 14 is analyzed to seek any events that exhibit an approximate periodicity (step 43), based on certain parameters 44. The parameters 44 can include history depth, sensitivity, a minimum chain size, time period for time aggregation, etc. Finally, in the detection phase 32, the process 30 outputs raw approximate periodicity results 45 that include, for each event where there was some approximate periodicity found, a classification of the approximate periodicity, precision of the approximate periodicity, events involved, etc.

In the monitoring phase 34, the raw approximate periodicity results 45 can be analyzed to build advanced statistics and correlations (step 46) to output raw statistics 47. The monitoring phase 34 can look at ongoing data to monitor the precision, such as weekly and daily behavior, of the raw approximate periodicity results 45.

In the characterization phase 36, the raw approximate periodicity results 45, and the raw statistics 47 are used to transform the events having the approximate periodicity into natural language (step 48), based on a natural language database 48, machine learning model, etc. The natural language result may be presented to a user via a user UI (step 50). Of course, the natural language result is in a meaningful form for action by the user. Note, the characterization phase 36 may be separate and independent from the prediction phase 38.

In the prediction phase 38, the raw statistics 47 are used in both a training phase and a production phase where a machine learning (ML) model 51 is used for prediction. The training phase utilizes the raw statistics 47 as training data for supervised learning (step 52). Specifically, this includes, if possible, determining a hypothesis for the next event in the raw statistics 47 (step 53) and checking if it occurs. If the event that is hypothesized occurs, associated data in the raw statistics 47 is labeled with that event for supervised learning (step 54).

Machine Learning operates by using the training data to train and build the machine learning model 51 (step 55). In the training phase, the training data is selected from the raw statistics 47 to show types of data that correspond to different events. By selecting a broad range of training data that reflects operating conditions, the machine learning model 51 is configured to find similar events in production data, for the purpose of prediction.

For prediction, this learning can automatically find and select the period statistics (learning set data) that are the most important for good predictions. This learning set data can be automatically selected and weighted by a machine learning algorithm (such as a tree learning) to build a model that fits the data. Of note, depending of the data nature, the selected statistics used to make accurate predictions may be different from one system to another. For example, in networking data, statistics based on weekly behavior may have more importance than in a financial system, which mostly use continuity statistics. That is a reason to use machine learning training.

Also, candidate statistics for training in the learning set data may use event carried numeric data ("carried data") depending of the nature of an event, such as number of impacted subscribers, duration, etc. This data is transparent, with respect to approximate periodicity detection, due to the wrapping, i.e., this data is not needed to detect approximate periods. All that is required to detect approximate periods is an event identifier and time. However, this extra information is useful at the training level for machine learning, i.e., the trends on the carried data can be relevant for predictions. For example, a ML model could select weekly behavior statistics, continuity statistics, and trends on impacted subscribers to build the model.

In the production phase, the raw statistics 47 that represent may represent real-time operational data are analyzed by the machine learning model 51. Of note, the raw statistics 47 can include historical data that is labeled by an operator for the training phase as well as real-time production data, which is generated during operation and is not labeled. An output of the machine learning model 51 includes a prediction of future events based on analysis of the real-time operational data (step 52), and this output can be displayed in the end-user UI (step 53). Of course, the prediction is based on the efficacy of the machine learning model 51 and the scope of the training data.

Approximate Periodicity Detection

The UI can include a timeline visualization, which is a graphical display of several events of different types that occurred during the past several days or weeks. Timeline visualizations are useful for displaying events, their durations, and their impact, for root cause diagnosis and for remediation. One approach for an efficient and useful timeline visualization is described in U.S. patent application Ser. No. 16/869,817, filed May 8, 2020, and entitled "Timeline visualization and investigation systems and methods for time lasting events," the contents of which are incorporated by reference in their entirety. The present disclosure looks at these events to determine ones that are periodic or approximately periodic. Detection of approximate periodicity is done so that it may be possible to predict future events, for proactive remediation.

As described herein, an event of the timeline is referred to as a case. That is, a case may be an event determined in the data 14 that has a duration, category, severity, and/or impact. The terms "case" and "event" may be used interchangeably with respect to a timeline. Each case can have a different category, and each case can also include multiple subcases. As described herein, a case is a way to provide details of what a particular event on the timeline relates to, i.e., a category. Examples of cases include, in a telecom network, each case can be a correlation of issues in the network that may have a common root cause. The subcases can all be related to the associated case, and the impact can be a number of distinct impacted subscribers. For financial monitoring, a case can be an uncollectable/doubtful account, and the impact can be the amount of money owed.

As described herein, periodicity and almost periodicity describe the recurrence of an event or a cycle in which an event occurs. Detecting the periodicity or recurrence allows the monitoring system 10 to highlight the cases in the user interface, which provides information about events to users. This can help a user to detect a specific issue characteristic, which is the reason for the recurrence, and help to diagnose and manage the priority of action.

Events can be found to be periodic based on their frequency of repetition. In a network, counters are typically linked to traffic, with day/hour distinction, and weekend/week distinction, that can vary from country to country. Events can have short-, mid- and long-term periodicities, recurrences, or cycles. For example, hourly and weekly repetition patterns are common in the telecom network field. The periodicity or recurrence can also have a seasonality component, variations that occur at specific regular intervals and which can be caused by various factors such as weather, vacation, traffic, work hours, holiday, etc. Seasonality includes a periodic, repetitive and generally regular/rough and predictable pattern in the levels of a time series, including a chain that occurs just once.

To flag an event as recurrent, periodic, or approximately periodic, the monitoring system 10 has identified a recurrence that fits within specific periodicity parameters.

Example Approximate Periodicities Include

X number of hour periodicity (e.g., every 2 hours);
Daily periodicity (e.g., every day between 7 h and 7 h30); and
Weekly periodicity (e.g., on Mondays between 7 h and 7 h30).

In the present disclosure, periodicity includes pseudo-periodicity, almost-periodicity, and approximate periodicity. As described above, the term approximate periodicity or simply "periodicity" includes periodicities with exceptions and ranges of values.

The present disclosure includes a periodicity detection process that can take into account the parameters 44, which bound certain cases together. Also, the parameters 44 can include a location for the impacted subscribers and/or a Radio Access Technology (RAT) (2G, 3Gs, 4G, 5G) constraint, as well as an auto-diagnosis result to seek periodicities on specific types of root causes. The periodicity detection process can have a small or high granularity depending on the user's preferences. An optional pre-aggregation of data can be configured for input. The periodicity detection process can work on this aggregated data. It is used to reduce the amount of data and allow minimal time imprecision into periodicity seeking by increasing the time granularity (e.g., 15-minute data).

Once a periodicity is detected, the event can then be flagged as recurrent. Note, the grouping is before periodicity detection, i.e., same events are grouped together and periodicity is sought. This grouping can be through an aggregation key, e.g., each type of event can be given a specific aggregation key. As a first step, all events that show periodicities can be grouped together. Here is an example grouping in a wireless network example, from the broadest scope to the finest distinctions:

(i) By Service type (e.g., voice);
(ii) By Rule (e.g., E-UTRAN Radio Access Bearer (eRAB) setup failures));
(ii) By Rule+dimension value (e.g., eRAB setup failures for RAT); and
(iii) By Rule+dimension value+diagnosis result (e.g., eRAB setup failures for RAT caused by cell X that is overloaded).

A level (ii) grouping may typically be the right starting point, letting the user determine if a higher or lower level is relevant for his or her purposes.

As a second step, characterizing the periodicity of an event flagged as recurrent can be quite helpful to the user for his investigation. The characterization of the recurrent event is the explanation as to why it was identified as recurrent.

An example characterization would be the following: "happens mainly between 7 and 7 h30 outside of weekends, especially on Mondays, since the past two weeks."

The goal of the second step is to take groups of elements of the first step as input in order to process the group content, especially the dates, to analyze the sequence, to find the strength of the periodicity, to determine the characteristics of the periodicity, and, finally, turn into natural language the characteristics for output in the UI.

Characteristics of a periodic chain may include the following example aspects:

The standard deviation of an hour?
The standard deviation of duration?
Strictly fixed hours?
Always on the same day?
Always on weekends?
Never on weekends?s
Always during the week?
Never during the week?
Continuous events?
% of continuity
% of occurrence among the global time
Tend to be more frequent?
Did the last three events occur without missing value?
Precision of the period
Number of noise events during period seek (number of events of same nature out of period)
Noise ratio (noise events divided by all events)

Also, there are additional details herein under the section—Periodicity detection process—periodicity statistics—that describe statistics and inputs.

The useful statistics for a particular dataset will be related to that dataset and could vary from dataset to dataset and from the technology area to the technology area. Some of the statistics useful to detect and characterize periodicities are not necessarily meaningful to the user and are simply used by the periodicity detection process.

It is relevant to determine the strength or score for the characterization.

Providing characterization information facilitates a user's understanding of the issues at play. For example, a characterization statement in natural language can be used, or graphical icons can be used on a visual interface to provide more details about the periodicity. This characterization information is optional. For example, in a natural language statement, the characterization message could be of the type "every day of the week between 7 h and 7 h30, except weekends." In this example, there is uncertainty in the start hour (a time range is provided), and the statement "every day of the week" includes the exception "weekends."

Furthermore, it is interesting for the user if the evolution of the approximately periodic events is characterized. The evolution may concern other event-linked metrics, such as the duration of the event and the number of impacted subscribers or severity. For example, statements of the type "tends to impact more and more subscribers over time" or "always identified as a major severity level in the last two weeks" can be used to convey the change of event characteristics over time.

The choice of words of the statement can help distinguish between facts related to an exact periodicity and tendencies related to an approximate periodicity. Words such as "tends to" and "seem" indicate uncertainty on the statement, whereas words such as "always," "fixed," "all," etc. indicate precision.

In general, users wish to prioritize the detected events to act upon the ones that seem to impact the most subscribers or for which the correction is easy to determine and implement. When periodicities are characterized, it may be possible to optimize their management of event priority. For example, small issues with only a few impacted subscribers would not normally receive a high priority. However, if a recurrence is detected, a global impact may be assessed, and the event may be re-prioritized for action.

A timestamped sequence (the characterization of the periodicity) is therefore transformed into a natural language statement to describe the periodicity using a "translation" algorithm.

Periodicity Detection Process—Initial Data Requirements

The data 14 includes a plurality of records, and, for operation, the data 14 requires events to have, at a minimum, a start time and a unique identifier. The start time can be a start timestamp, e.g., UTC 1588580970. The unique identifier is used to identify the event and can be anything to recognize the results, e.g., an incremental dummy identifier such as "event 34."

Events can 'carry' additional optional information such as type or dimension, additional metrics, etc. The type or dimension information is used when events of different nature coexist in the data 14. The periodicity detection process seeks periodicities into events of the same nature only. This type or dimension data acts as a key to avoid unexpected mix. Note, if using several types and dimensions for each event, all may not be used as a key to create 'same nature events.' The periodicity detection process allows the user to choose which types/dimensions will be the one(s) to use to create separate event queues to detect periodicities. For example, type: CALL SETUP FAILURE, dimensions: RAT, CELL. Use only type plus RAT as keys.

The additional metrics can include the duration of the event, impacted subscribers, or whatever data is linked to the event. This data is not used to detect periodicities, but may be used for a context for the event. Some of those data can be chosen to keep track of their trend when periodic events have been found. This trend can be interesting to show to the user and may be used in the process at the prediction of future events step (it can be part of the learning set for machine learning).

Periodicity Detection Process—Parameter Details

As noted in the detection phase 32, there is the wrapping and sorting configuration 42 and the parameters 44. The wrapping and sorting configuration 42 is used because the periodicity detection process can be generalized and use records from different data sources for the data 14. The wrapping and sorting configuration 42 is configured to map/format "start-time" and "unique identifier" mandatory data for each record to a uniform data structure. The wrapping and sorting configuration 42 can convert and format different time notations to a uniform time data structure for the start time. For example, one data source may keep time in a 24-hour manner, whereas another may keep it to a different time zone, e.g., GST, etc. The wrapping and sorting configuration 42 can be configured to map the unique identifier to a uniform unique ID data structure. The non-mandatory data can in columns and mapped as well to uniform data structures, e.g., numeric, strings, etc. Any label type can be declared as an aggregation key for event nature distinction. For example. [duration:numeric], [metric_name: label, AGGREG_KEY], [technology: label], . . . means that periodicities will be looked for within same metric_name events only (one result per metric_name).

The parameters 44 include history depth, sensitivity, minimal chain size, and optional time aggregation interval. The history depth describes how far from the current time to the past, the periodicities are sought. For example, the data 14 includes collected timeline data, and older data will not be used to seek for periodicities, based on the history depth setting. The sensitivity defines a range for the approximate periodicity, i.e., the "almost" term (or more or less ±). A low parameter like 1 minute will only recognize strict periods, such as every 8 h (±1 minute), whereas a larger parameter like 30 min may find more results, like every day ±30 minute (7 h20, 7 h50, 7 h34 is considered as an approximate trend to put as a result is this case). That is, the sensitivity term is typically defined in minutes. The sensitivity value depends on the input nature, and what the user is seeking, and this can be a user-adjustable parameter such as through the UI.

The minimal chain size defines how many events separated by an approximate period value (±the sensitivity) is enough to consider a trend as a result that can be shown to the final user and reused to further steps. In an embodiment, the minimum value is 3. The higher the parameter is, the stronger is the trend. The value to choose for this parameter has to be considered with the history depth. For example, weekly single day events (like every Monday at 8) with a chain size of 3 will need at least three weeks of history to be discovered (whereas daily who needs less history). Note, some items can cover several periodicities. For example, events separated by 24 hours on Mondays, Tuesdays, and Wednesdays. It is possible to consider 24H periods of several discontinuous chains, those chains are separated by a week. The pattern should consider at least 2 periods.

The maximal allowed number of continuous missing occurrences defines how many continuous missing occurrences can happen between two plain events. If the number of continuous missing occurrences exceeds this value, the chain is considered finished. If set to zero, it means that no missing occurrences in the periodic chains are allowed at all.

Periodicity Detection Process—Periodicity Statistics

Again, the detection phase 32 is configured to automatically detect approximately periodic results from a data set, and the monitoring phase 34 is configured to process the raw results into statistics that can be turned into natural language for ease of human understanding of found almost-periods, or be used as learning set for machine learning predictions of future events.

The input to the monitoring phase 34 is a result of the detection phase 32, such as on timeline events of different nature. Of course, any approaches may be used for the input to the monitoring phase 34. Each result includes the event nature and each periodicity found including periodicity characteristics and associated per-day chains of events. Each event carries all its configured mandatory and optional data. Mandatory data includes start time and unique event identifier. Optional data can be numeric and/or type (dimension) data associated. The numeric data can used to associate in the natural language description, if any major trend occurs over time within those periodic events. The type/dimension labeled data is part of the event descriptor and some of those fields can be used to create 'event nature' and used as aggregation keys for seeking periods.

Input data structure—consider the following EVENT structure:

[EVENT]: Start time, Unique ID, (metric(s)), (type(s))

Consider an APPROX PERIOD SINGLE RESULT structure:

```
[APPROX-PERIOD 1]: period: N1,
precision: P1, noise events nb*: X1
    [DAY 1]:            EVENT LIST CHAIN 1.1.A
                        EVENT LIST CHAIN 1.1.B
                        [...]
    [DAY 2]:            EVENT LIST CHAIN 1.2.A
                        EVENT LIST CHAIN 1.2.B
                        [...]
    [...]
    [DAY N]: EVENT LIST CHAIN 1.N.A
```

EVENT CHAIN LIST is a 'chain of continuous events' and each event of the list has a distance to its neighbor(s) corresponding to period ±precision. Each event list is classified by day, it can be helpful to describe patterns repetitions day-dependent. Each day can contain one or several LIST CHAIN(s), i.e., periodic chains. Those list chains are discontinuous between each other, it is to say that the last event of one chain is not separated by the almost-period from the $1^{st}$ event of next chain. No event can belong to both chains in this case, and no chain time range can overlap one other chain time range. For example:

```
[APPROX-PERIOD 1]: period: 40 minutes,
precision: ±6 minutes, noise events: 255
[18 May]: EVENT LIST CHAIN 1.1.A
    {E1: start time: 7 h 05, duration: 14 min,
    E2: start time: 9 h 50, duration: 11 min,
    E3: start time: 10 h 29, duration: 12 min}
    EVENT LIST CHAIN 1.1.B
    {E4: start time: 16 h 20, duration: 19 min,
    E5: start time: 16 h 54, duration: 10 min,
    E6: start time: 17 h 38, duration: 16 min}
[25 may]: EVENT LIST CHAIN 1.2.A
    {E7: start time: 7 h 15, duration: 10 min,
    E8: start time: 9 h 55, duration: 13 min,
    E9: start time: 10 h 33, duration: 15 min,
    E10: start time: 11 h 10, duration: 14 min}
    EVENT LIST CHAIN 1.2.B
    {E11: start time: 16 h 16, duration: 14 min
    E12 start time: 17 h 35, duration: 13 min}
```

Note, in case of periods >12 hours, the EVENT CHAIN LIST can be composed of only one event, because as the period is high, the following event is registered at the following day. For example:

```
[DAY 1]: EVENT LIST CHAIN 1.1.A
    {E1: start time: 16 h 16, duration: 14 min }
[DAY 2]: EVENT LIST CHAIN 1.2.A
    {E2: start time: 16 h 10, duration: 11 min }
[DAY N]: EVENT LIST CHAIN 1 .N.A
    {E3 start time: 16 h 20, duration: 17 min }
```

Note, it is possible that the last item of DAY 1 (from EVENT LIST 1.1) and the first item of event list of following day (DAY 2) (from EVENT LIST 1.2) are although neighbors with period (±precision) has distance. In this case, there is a continuous event chain, and it has to be noticed in description. [DAY X] is only registered for NOT empty list of events Note, NOISE EVENTS* is the number of events of the same nature during the approximate period range window (FROM 1$^{st}$ event start time of 1$^{st}$ chain to last event stat time of last chain) that were seen during period-seek but NOT retained into event chains (it is to say 'out of period items').

Considering the previous sub-structures description, the global input data structure can be described as (APPROX-PERIOD is an approximate period):

```
[EVENTS OF NATURE A]:
    [APPROX-PERIOD A.1]
    [APPROX-PERIOD A.2]
    ...
    [APPROX-PERIOD A.N]
[EVENTS OF NATURE B]:
    [APPROX-PERIOD B.1]
    [APPROX-PERIOD B.2]
    ...
    [APPROX-PERIOD B.N']
[...]
[EVENTS OF NATURE Z]:
    [APPROX-PERIOD Z.1]
    [APPROX-PERIOD Z.2]
    ...
    [APPROX-PERIOD Z.N"]
```

Note, the APPROX-PERIOD Item only exists if it contains at list one day of not-empty chain of events, so that if events of a precise nature does not show any approximate period, the section for those events nature will simply not exist in the structure. In the natural language description, there is no interest in crossing information between events of different natures, even if some almost-periods seem identical. Each description from an event nature type will be separated from the other as several independent results.

For the extraction of almost-periodicity characteristics, the data structure described above is enough to extract additional information (and turn it into human readable data (natural language)).

In FIG. 2, the step 46 will process the input data and build advanced statistics based on the content. The step 47 will re-use the statistics as input (in order to create the natural language description ready to be displayed for a user (it acts as a synthesis of the statistics in human readable text)). The step 46 results are very interesting to keep because part of this data may be re-used by other algorithms, such as prediction of future events and can use part of this data as learning set for supervised learning.

To build advanced statistics from approximate period results, the advanced statistics are built per APPROX-PERIOD, so that there is a result for each almost-period of each event nature. Each result is independent from the other. Note, sub-periods of the same period should not exist in the results as they have been erased during almost-period seek process. The nominal period is only kept.

```
[APPROX-PERIOD 1]: period: N1, precision: P1,
noise events nb*: X1
    [DAY 1]: EVENT LIST CHAIN 1.1.A
        EVENT LIST CHAIN 1.1.B
        [...]
    [DAY 2]: EVENT LIST CHAIN 1.2.A
        EVENT LIST CHAIN 1.2.B
        [...]
    [...]
    [DAY N]: EVENT LIST CHAIN 1 .N.A
```

It is possible to consider several types of statistics, a lot use the timestamps (start times) associated to the events into chains. Each start time is converted into a date, to consider the day of the week it occurs has important data to consider. Most of those statistics are interesting to compute based on the PERIOD-RANGE: FROM lowest event start time of all chains to latest event stat time of all chains. There are two other important parameters to consider:

The CURRENT TIME of processing in the case of real-time data, to consider the latest tendency and to know whether there is isolated past-period phenomena, or ongoing period sequences.

NOISE-EVENTS: The number of events of the same nature that are not into the almost-period processed during the PERIOD-RANGE (those can or not be into other-periods). Consider that those items are likely 'noise' into the chain search, that can lead to 'random' results. The more noise there is, the less strong is the result. the events in the period result are called 'CHAINED-EVENTS.'

It is possible to divide statistics in groups, trying to answer those questions. Each statistic can have a unique ID defined such as [STAT-X] to create a reference to other statistics when they are built on top. The following provide examples of statistics; those skilled in the art will understand other statistics are also contemplated.

Occurrency Characterization

[STAT-C0] Single day or multiple day chains of events occurrences?
DESCRIPTION: How many different days do we face chains of events for this almost-period
CREATION PROCESS: Count number of distinct days of chains occurrence into almost-period result. Continuous chain of events from one day to the other has to be taken into account as one single chain
UTILITY: know if it is a repetitive almost-period over days
[STAT-C1] Multiple time slots period occurrence?
DESCRIPTION: How many different discontinuous hour time slots in a single day do we face chains of events for this almost-period?
CREATION PROCESS: For each single day: Count number of distinct chains
UTILITY: seek for hour time ranges of chains repetitions with this period
Daily/Weekly Behaviour
[STAT-W1] Distribution of chain occurring per day of the week during PERIOD-RANGE DESCRIPTION: Only useful for periodic chains of events with same almost-period found on several days [STAT-00]. Create statistics of day of the week occurrences of chains to build other statistics of this section.

CREATION PROCESS: Uses. Use timestamps of events to recover the day of the week it happened and aggregate data per day of the week Example: (Mondays: 2 chains (100% of Mondays of the period-range), Tuesdays:1 chain (50% of Tuesdays of the period range . . . ) . . . )

UTILITY: Those per day statistics will allow to build sub-stats

[STAT-W1.1] Is it specific day(s) problem?

[STAT-W1.2] Is it linked to week or weekends especially?

[STAT-W2] Distribution of event occurring (into chains) per time-slot of the day during PERIOD-RANGE DESCRIPTION: Hours of periodic events occurrences within days CREATION PROCESS: Use timestamps of events to recover the hour of the day it happened. One day can have several discontinuous sub-slots of periodic chains into a single day.

For example continuous: (16 h to 17 h:5 events (60% of period-range for this slot), 17 h to 18 h:3 events (50% of period range. For this slot.), . . . )

For example discontinuous: (16 h to 17 h:5 events (60% of period-range for this slot), 20 h to 21 h:3 events (50% of period range. For this slot.), . . . )

UTILITY: understand if periodicity seen is hourly linked or not (especially for multiple days occurrences)

If at least 3 chains into a same day: compute the timestamp deltas between chains [STAT-W3] and compute the sqrt error Mixing both distributions ([STAT-W1]+[STAT-W2]), we characterize the weekly/hourly behavior of the almost-period Example Mondays (6 chains) 100% of Mondays+Tuesdays (2 chains) 25% of Tuesdays 15 h-16 h:4 events, 16 h-17 h:6 events, 17 h-18 h:3 events Will be turned into natural language:

Weekly Periodical pattern for chains of events showing same periodicities always occur on Mondays and sometimes on Tuesday. Happens in specific time range 15 h to 18 h Continuity:

Does it seem an isolate past phenomenon?
  One chain seen one single day, far enough from current time, with no repetition
  Several chains seen, showing weekly or daily pattern in the past but disappear close to current time Ratio of days containing chains of events/total days of PERIOD-RANGE
  Shows density of period events: is it compact?

Subgroups of CHAINS?

Considering past events chains and current time, could it occur again?
  Single chain ongoing
  Several chains with pattern, showing weekly or daily pattern:
    Unfinished last chain detection
    OR potential new chain could begin after current day, considering the pattern What is the average chain size over days containing data Continuity of chains presence over days (considering eventual weekly specificities)

Maximal consecutive days of chain presence?

Is it increasing presence over days (considering eventual weekly specificities)?

Number of continuous

Result Precision

Number of chains

Average number of items per chain

Number of items per chain standard deviation

Start time Standard deviation

Cross chains median standard deviation?

Period Precision

If period is defined by [rangeMin, rangeMax]

Precision is:

$$100*(1-(rangeMax-rangeMin)/((rangeMax+rangeMin)/2))$$

So that if rangeMax=rangeMin, the precision is 100%

Noise Ratio

Computed on the whole chain period for events of the same type.

Noise=100*(number of events out of the chain/total number of events)

So that if all items are in the chain, the noise is 0%

A Low noise ratio is better for periodicity result strength, because it reduces the chance to find a period by luck, because a lot of events exists on the same range.

Associated Metric Trends

For each: Global increase or decrease on single chain?

From one chain to the other: comparison of metric at same time

Associated Types/Dimensions Analysis

Occurrences of chains presence per type/dimension cardinality (outside those used to create event nature)

Full example of statistics computing

Let's consider events of 2 natures (telecom data)
  Events of call drops (CD)
  Events of call setup failures (CSF)

This data has been processed by periodicity seeker with a history depth of 30 days: from $1^{st}$ May to 31th May.

We kept the event duration as metric of interest within the input data.

The periodicity seeker found 2 periods for the (CD) events and 1 almost-period for the (CSF) events.

This is the result structure we got at the end:

[EVENTS OF NATURE (CD)]:
  [APPROX-PERIOD 1]: period: 40 minutes,
  precision: ±6 minutes, noise events: 25
    [18 May]: EVENT LIST CHAIN 1.1.A
      {E1: start time: 7 h 05, duration: 14 min,
       E2: start time: 9 h 50, duration: 11 min,
       E3: start time: 10 h 29, duration: 12 min}
    EVENT LIST CHAIN 1.1.B
      {E4: start time: 16 h 20, duration: 19 min,
       E5: start time: 16 h 54, duration: 10 min,
       E6 start time: 17 h 38, duration: 16 min}
    [25 May]: EVENT LIST CHAIN 1.2.A
      {E7: start time: 7 h 15, duration: 10 min,
       E8: start time: 9 h 55, duration: 13 min,
       E9: start time: 10 h 33, duration: 15 min,
       E10: start time: 11 h 10, duration: 14 min}
    EVENT LIST CHAIN 1.2.B
      {E11: start time: 16 h 16, duration: 14 min
       E12 start time: 17 h 35, duration: 13 min}
  [APPROX -PERIOD 2]: period: 5 min,
  precision: ±"1" seconds, noise events 23
    [13 May]: EVENT LIST CHAIN 2.1.A -continued

```
    {E13: start time: 11 h 05, duration : 1 min,
     E14: start time: 11 h 10, duration: 1 min,
     E15: start time: 11 h 15, duration 1 min}
  EVENT LIST CHAIN 2.1.B
    {E16: start time: 12 h 05, duration: 1 min,
     E17: start time: 12 h 10, duration: 1 min,
     E18: start time: 12 h 15, duration 1 min}
  EVENT LIST CHAIN 2.1.0
    {E16: start time: 13 h 05, duration: 1 min,
     E17: start time: 13 h 10, duration: 1 min,
     E18: start time: 1 3h 15, duration 1 min}
[EVENTS OF NATURE (CSF)]:
  [APPROX-PERIOD 3]: period: 24 H,
  precision: ±15 min, noise events :100
    [22 May]: EVENT LIST CHAIN 3.1.A
      {E1: start time: 16 h 16, duration: 14 min}
    [23 May]: EVENT LIST CHAIN 3.1.B
      {E2: start time: 16 h 10, duration: 14 min}
    [24 May]: EVENT LIST CHAIN 3.1.0
      {E3 start time: 16 h 20, duration: 13 min}
    [25 May]: EVENT LIST CHAIN 3.1.D
      {E2: start time: 16 h 11, duration: 16 min}
    [26 May]: EVENT LIST CHAIN 3.1.E
      {E3 start time: 16 h 21, duration: 17 min}
    [29 May]: EVENT LIST CHAIN 3.1.F
      {E3 start time: 16 h 12, duration: 20 min}
    [30 May]: EVENT LIST CHAIN 3.1.G
      {E3 start time: 16 h 16, duration: 21 min}
    [31 May]: EVENT LIST CHAIN 3.1.H
      {E3 start time: 16 h 12, duration: 22 min}
```

As we see here, we face different kinds of periodicities with very different characteristics, this is the computation of the statistics on those periods:
Let's say that the 22th of May is a Monday for an example to show the computation of statistics.

|  | APPROX-PERIOD 1 | APPROX-PERIOD 2 | APPROX-PERIOD 3 |
|---|---|---|---|
| STAT-C0 | Multiple-day | Single day | Multiple-day |
| STAT-C1 | Multiple slots | Multiple slots | Single-slot |
| STAT-W1 | Mondays: 0 | N/A | Mondays: 2 |
|  | Tuesdays: 0 |  | Tuesdays: 2 |
|  | Wednesdays: 0 |  | Wednesdays: 2 |
|  | Thursday: 2 |  | Thursdays: 1 |
|  | Fridays: 0 |  | Fridays: 1 |

Periodicity Detection Process—Periodicity Seeking

Figure 3:
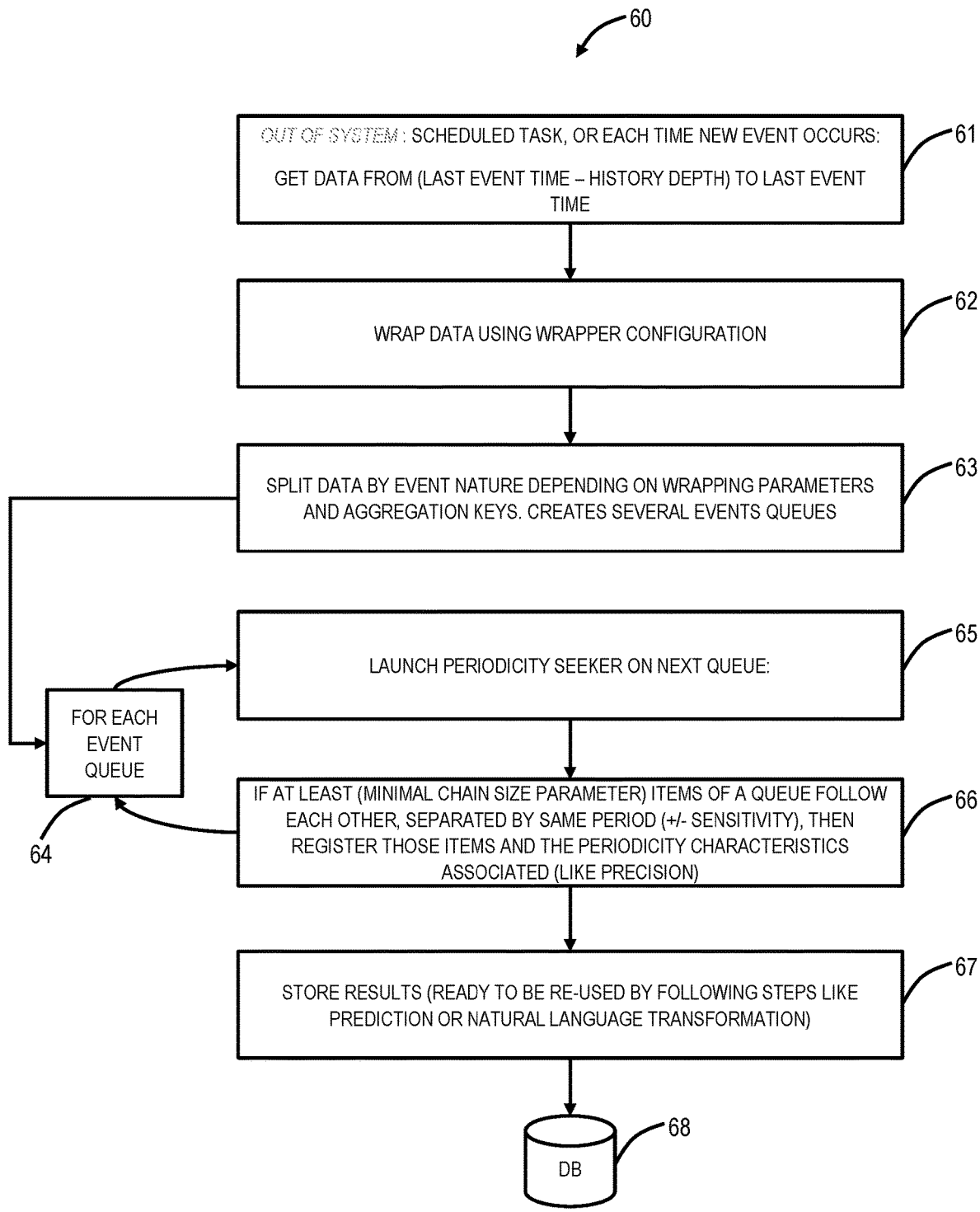
FIG. 3 is a flowchart of a periodicity detection process that takes the data as input and outputs events having approximate periodicity based on the parameters.

FIG. 3 is a flowchart of a periodicity detection process 60 that takes the data 14 as input and outputs events having approximate periodicity based on the parameters 44. The periodicity detection process 60 can be a scheduled task performed periodically or performed based on a trigger, e.g., a new event. The periodicity detection process 60 includes obtaining the data 14 (step 61). The data 14 can be filtered to include data from the last event time minus the history depth to the last event time. The last event time could be the present time or any other time, and the data is obtained based on the history depth.

Next, the periodicity detection process 60 includes wrapping the data using the wrapping and sorting configuration 42 (step 62). The periodicity detection process 60 includes splitting the data by event nature depending on wrapping parameters and aggregation keys (step 63). Also, the periodicity detection process 60 includes creating multiple event queues for storing data. Here, there can be a queue for each aggregation key. The queue can include a list of the data of the same type based on the aggregation keys. Also, the data in each queue can be sorted. Further, the periodicity detection process 60 can include a data time aggregation if configured (in this case, an aggregated events carries all its original non aggregated events, so that it is possible to compute mean and sums of each bound data, such as impacted subscribers, durations, etc.).

The periodicity detection process 60, for each event queue (step 64), launches a periodicity seeker (step 65) that evaluates the queue to determine if, at least (minimal chain size parameter) items of a queue follow each other, separated by the same period (±sensitivity), then register those items and the periodicity characteristics associated therewith (step 66). These steps include evaluating the data in each queue to see if they match the required parameters 44 to declare they are approximately periodic. At end of this step, subperiods tracking can be done and chains of events with same periods/characteristics are stored into a same single periodicity result.

Finally, the periodicity detection process 60 includes storing results (step 67) in a database 68. This can include the raw approximate periodicity results 45, which can be used as described herein.

Periodicity Detection Process—Example

Figure 4:
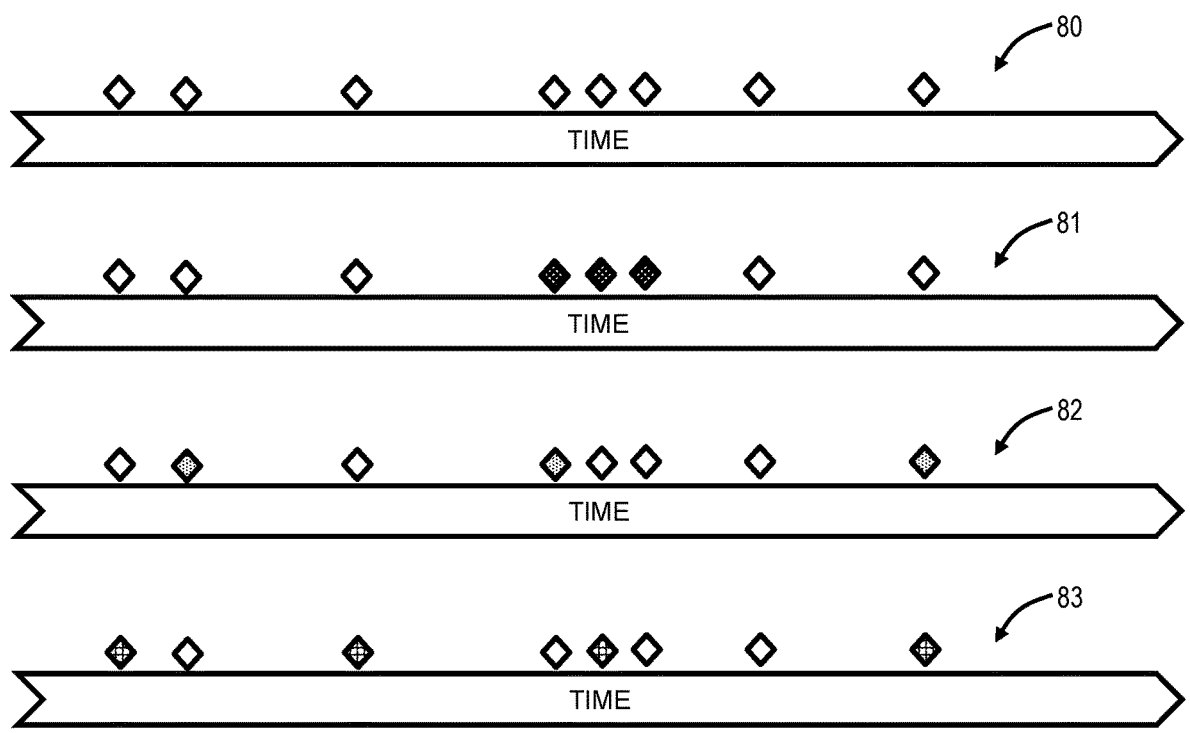
FIG. 4 is a diagram of a timeline for illustrating an example of the periodicity detection process of FIG. 3.

FIG. 4 is a diagram of a timeline for illustrating an example of the periodicity detection process 60. For illustration purposes, the example in FIG. 4 is with a reduced number of events, namely eight. At step 80, all eight events are on the timeline with the diamonds indicating event start time.

The purpose of the periodicity detection process 60 is to answer this question: is there, or are there some kinds of periodicities in this sequence? And if yes, what are the characteristics (how many items in each sequence? Are there strict periods or not?

As can be seen at the step 80, it is not so easy to find approximate periodicities at first glance. And there are only eight items in this example, and practical implementations can include hundreds or thousands of items or more. Also, note, the periodicity detection process 60 is seeking the smallest periodicity sequences, not multiple periods. For example, eight items separated by 2 h could be seen as 2×4 items separated by 4 h, but this is not the desired result.

The result of the periodicity detection process 60 mainly depends on two parameters: the sensitivity and the minimal chain size. The steps 81, 82, 83 in FIG. 4 illustrate examples of the kind of periodicities that can be found with different sets of the parameters 44.

First, the parameters are set high sensitivity and minimal chain Size=3, and this gives two results—a first one in step 81, the three highlighted diamonds in the middle, and the second one in step 82 with the three highlighted diamonds spread out. There is a requirement to check if the item in the middle is involved in multiple periodicities. Also, there is a requirement to check if one period is not a sub-period of the other (this is not the case here).

Some other events seem to be approximately periodic, but the sensitivity is high, so they are rejected. In step 83, the sensitivity is lowered, and the minimal chain size is increased to four, yielding the four highlighted diamonds. The four highlighted diamonds are approximately periodic, but not very well defined. The interval between $1^{st}$ and $2^{nd}$ diamonds and the interval between $3^{rd}$ and $4^{th}$ diamonds are not the same, but the difference does not exceed the chosen sensitivity so that they are considered as approximately periodic for the result. This is a key concept.

As minimal chain size is larger than three, the step 83 does not find the previously found periodicities (in the steps 81, 82).

The periodicity detection process 60 groups together items based on the distance between them. The present disclosure also contemplated semantic natural language description, or building learning set for prediction, for the purpose of understanding the data linked to those bounds items (days/hours of occurrence, associated metrics, trends sequences repetitions, etc.).

Periodicity Detection Process—Detailed Steps

In the periodicity detection process 60, define distance from one event to another as the absolute value (ABS) of difference between their two start timestamps. One event A is said closer to an event B than another event C if their timestamps difference is lower:

$$ABS(startTime(A)-startTime(B)) < ABS(startTime(A)-startTime(C))$$

(1) sort input events by start time.

(2) Seek for the number of days to compute based on the oldest and newest events.

(3.1) For each event A of the sublist, register all other events list (B, C, D . . . ), and order them by distance from A.

(3.2) based on the sensitivity and a predefined step, build a predefined window set of values that will be used to scan the data as time intervals. The smallest windows will be tested first. By doing so, even if the sensitivity is low, this tries to find periodicities at the most strict accuracy as possible.

(3.2.1) For each window of the window set, use it as a sliding window on N computed test-intervals of the time range of the whole data history.

(3.2.1.1) For each test-interval, scan all events.

(3.2.1.1.1) For each event, try to build a continuous chain of events matching the test-interval as a distance for each chain neighbor, and equals or exceeds the minimal chain size configured. For an event A, each test includes selecting all other later events which distance is contained into the test-interval. For each of those matching events, recursively test them like A with their neighbors in the same way, until there is an event with no distance matching (end of the chain). In this case, if no missing occurrence is allowed by configuration, this is the end of the chain. Otherwise, seek for the next item just as if the occurrence had been there (and continue the chain taking into account the count of missing occurrence). Then compare the result of the chain size to the minimal chain size to choose if the result is kept or not. In this step, several paths to build a chain can be found; in this case, test all paths and keep the one that can continue. If several continue, keep the 1$^{st}$ one.

(3.2.1.1.2) If a chain of events has been found, then seek for previous time-interval iteration results, to see if this chain has already been found in a previous iteration. If not, see if the chain is an extension of a previous result. The goal of the window size change is to allow extension of results chains to get the biggest chain matching sensitivity. Store the chain and the matching test-interval into the current day result structure (one can have several test-intervals matching.

(4) At this step, all history can have several periodicity results (chain of events+ranges of matching) or not.

(4.1) For a given periodicity, group together into a same periodicity result all discontinuous chains of events matching the period. For example, Monday—found three events at 8 h05, 9 h05 and 10 h02, Tuesday—found four items at 15 h02, 16 h06 17 h01 and 18 h04. Depending on a tolerance factor, this two-period result may be bound together because periodicities and sensitivity are close.

(5) Detect and purge sub-periods: Keep only nominal periods chains.

(6) write results of periods found. A period result includes a list of daily chains of events, each chain events having neighbors separated by the same approximate periodicity. The global precision of the result is the highest imprecision of the period for all chains of the result. The imprecision of the period is found by computing distances between all neighbors within a chain and subtract the highest distance with the lowest distance, and, for each result, compute and save the noise ratio.

Periodicity Detection Process—Results

The results from the periodicity detection process 60 can be reused as inputs for further steps in the process 30. This can include analyzing chain event bounded data (dates, metrics, etc.), such as to convert into a natural language description of approximate periodicities found, to create statistics that can be used as a learning set for prediction supervised learning.

Prediction

If the characteristics of the period appear strong enough, especially if periodicity is confirmed as a fact on the most recent events, this can be used to make predictions of future potential events. Predicted events may include a degree of uncertainty, taking into account uncertainty in their occurrence, in the start time, in the duration, in the number of impacted subscribers, etc.

Most users would love to know of potential upcoming events before they occur, for proactive remediation.

Depending on the characteristics found in the results 45 and the raw statistics 47, for example, standard deviations, continuity, the occurrence of most recent events, etc., the monitoring system 10 can choose to use this periodicity to predict future events with an evaluation of the probability of occurrence. This is called the strength or score of the characterization. Some periodicities may be selected among all found when they are sufficiently well characterized and/or important.

The process 30 can take into account the characteristics of the periodicity and use them to make predictions, if appropriate.

Alternatively, or additionally, an artificial intelligence algorithm (machine learning) can be used to determine the score or strength of the characterization and determine if it is to be used for predictions. Machine learning is used to find out what is the right strength formula (which period characteristics to use and associated weight factors). A learning process may determine the thresholds and parameters instead of using fixed thresholds or prerequisites.

At first, very broadly defined thresholds can be used to issue predictions. These predictions may be kept hidden from the user. If they indeed occur, they are flagged as "OK," otherwise they are flagged as "KO." The characterization dataset and the OK/KO flags can then be used to create a machine learning model that is then trained. If the model converges, it can be used directly after the characterization step and used to predict OK/KO events. Only OK events can be displayed to the user as predictions. This allows for adaptive thresholds.

Periodicity Detection Process—with Missing Instances

A first condition to allow computation of a prediction will be a predefined threshold on the periodicity accuracy (PA), reflecting the strength of the period. Consider that 100% is a perfectly precise and accurate period (top strength). A basic formula of PA can be:

$$PA=(Range\ Precision+10\times Chain\ Size+(100-Noise\ Ratio))/3+Bonus$$

The bonus is used to give extra points to the PA if Range Precision is very high (strict periods) and more again if Chain Size is High:

If(Range Precision >95% and Chain Size >4)

Bonus=(Range Precision−94)*(Chain Size−3)

If PA exceeds 100, it is set to 100. If PA is lower than 0, it is set to 0.

For example, if period ranges are 48 to 50 minutes, if there are 25 noise events and if the period chain size is 5, then the PA computation will be:

Range Precision=100*(1−(50−48)/((50+48)/2))=96%

Noise Ratio=25/(25+5)*100=83%

Bonus=(96−94)*(5−3)=4

So that PA=(96+10*5+(100−83))/3+4=58%

The prediction is computed if PA bypasses a minimal THRESHOLD AND if the last chain item may be still ongoing, it is to say if the most recent item of the periodicity chain (timestamp T) matches this condition:

T+Period high Range>Current Time

For example, assume the current time is 22 January 10 h42. An approximate period [2 h05, 2 h15] has been found with 8 items. The last chain item is 22 January 09 h44. As 09 h44+2 h15 exceeds 10H42, the periodic chain may be still ongoing and is candidate to emit a prediction if PA is >THRESHOLD.

Improvement of this $1^{st}$ Basic Implementation Using Machine Learning (ML)

Taking into account the formula described before:

PA=(Range Precision+10×Chain Size+(100−Noise Ratio))/3+Bonus

A good range precision with a high chain size and a small noise ratio are good conditions to emit better predictions, but these include arbitrary weights to the formula, that could not be the most accurate at the end. Maybe noise is more important than chain size or some other condition.

It is possible to introduce p1, p2, p3, p4 as weights for each formula parameter as follows:

PA=($p1$×Range Precision+10*$p2$*Chain Size+$p3$* (100−Noise Ratio))/($p1$+$p2$+$p3$)+$p4$*Bonus In this kind of implementation, using 3 statistics (precision, noise ratio, chain size), Finding optimal p1, p2, p3, p4 could be via supervised learning such as tree learning. Tree learning will automatically compute the best p1, p2, p3, p4 for optimal predictions so that these weights are optimally determined.

As is known in the art, a model can be built by using training data where predictions are provided and evaluated against actual data. At the beginning, the THRESHOLD to emit predictions has to be low in order to emit false and true predictions. When the model is built and in use, the THRESHOLD would not be used anymore.

For example, a possible learning set to train a model is shown below ("Happened" is the label for supervised learning).

Range precision=77, Chain Size=6, Noise Ratio=44, Happened=TRUE
Range precision=55, Chain Size=4, Noise Ratio=64, Happened=FALSE
Range precision=51, Chain Size=5, Noise Ratio=22, Happened=FALSE This example uses three statistics for ease of illustration but can be extended to much more statistics as the ones described before (using additional data like sum of subscriber's impact, average durations).

Predictions Values Implementation

Predictions can be emitted conditionally to conditions in previous sections. The predictions are linked to a period and are supposed to continue in an existing period chain that is not yet over. They belong to the same category of events than the associated chain. They can include a timestamp "Tpred" depending of the period and the last chain item timestamp (T):

$T$pred=$T$+(rangeMax+rangeMin)/2

The central timestamp is associated to the timestamp imprecision, as part of the result for the final user:

Prediction at $T$pred+/−(rangeMax−rangeMin)/2

Some metrics can be associated to the prediction such as 'predicted impacted subscribers' or 'predicted duration," or whatever data linked to the item. In this case, the algorithm has to use certain number of past chain items to compute this, and it is possible to consider that the last items can have more weight that previous ones.

For example, assume use of the last three items of the chain for prediction (item1, item2, item3) with item3 as the most recent item, and define IS(itemX) as the number of impacted subscriber of itemX, then the computation of IS(item pred) as the predicted impacted subscribers for the prediction could be:

$IS$(item pred)=(1×$IS$(item1)+2×$IS$(item2)+3×$IS$ (item3))/6

This value will although have an imprecision associated for the results, depending for example of the standard error on those occurrences:

$IS$(item pred)+/−precision

A two-dimensional machine learning algorithm could be used to let the model find the different weights to use in that formula (instead of the weights 1, 2, 3). In this case, the learning would be only for predictions that really occur, and the value to learn would be the effective value of the linked data (such as impacted subscribers). The learning set could extend the learning to all values of the chain instead of using a limitation of three values, but the timestamp order has to be kept in the leaning set, so that newest values always have to be in same column An example of learning set to build a model and guess impacted subscribers for predictions:

$IS$(item($t$−3))=33,$IS$(item($t$−2))=22,$IS$(item($t$−1))=11,$IS$ (prediction occurred)=07

$IS$(item($t$−3))=44,$IS$(item($t$−2))=11,$IS$(item($t$−1))=24,$IS$ (prediction occurred)=12

$IS$(item($t$−3))=11,$IS$(item($t$−2))=33,$IS$(item($t$−1))=44,$IS$ (prediction occurred)=45

Note, this kind of learning algorithm could be a linear regression.

Examples of Approximate Periodicity

In a first example, a grouping can be based on a rule— Mobile Operator (MO) Voice over IP Multimedia Subsystem (VoIMS) Call Setup failures and this can be seen nine times in the available data, as follows:

Fri January 03 14:17:00 CET 2020
Tue December 31 14:00:00 CET 2019
Sat December 21 14:09:00 CET 2019
Mon January 06 14:03:00 CET 2020
Mon December 30 14:06:00 CET 2019
Tue December 24 14:45:00 CET 2019
Mon December 23 14:04:00 CET 2019
Tue January 07 14:04:00 CET 2020
Fri December 27 14:01:00 CET 2019

In a second example, periodicity can be found every day of the week at strictly 07:45 in the last two weeks, except weekends. If the current day is Saturday, a predicted event can be added on Monday at 07:45 with a duration that can be the mean duration of the previous weeks' cases.

In a third example, in another type of implementation, the prediction can use a recurrence sequence prediction algorithm. The prediction algorithm can predict the next sequence item of a list. For example, for an event list A: [1, 2, 3, 4], the prediction algorithm predicts 5, for an event list B: [1, 22, 1, 4343, 1, 878, 1, 897], the prediction algorithm predicts 1, for an event list C: [1579612911, 1579613911, 1579614911], the prediction algorithm predicts 1579615911, etc.

With the example event list C, the items could be GMT timestamps of cases in the periodicity group, and the prediction could be the next timestamp value.

Figure 5:
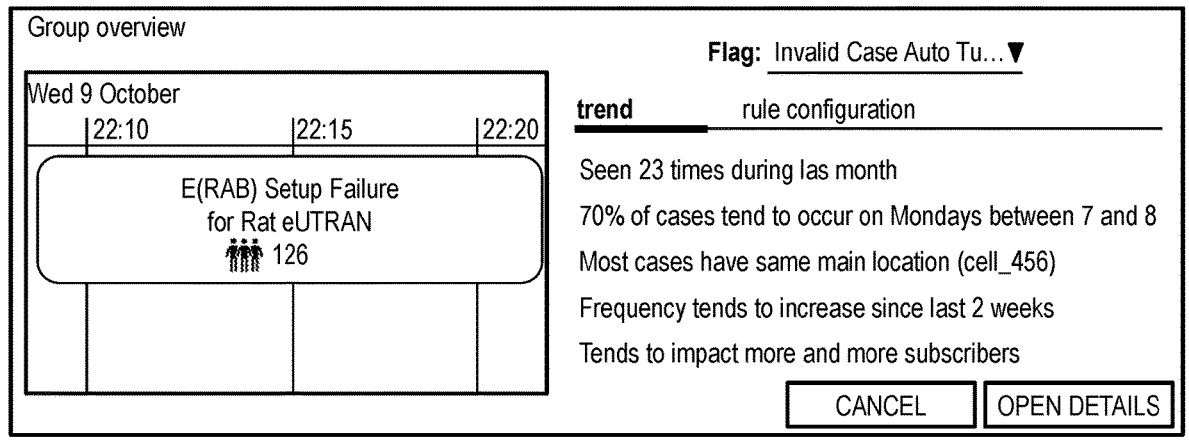
FIG. 5 is a screenshot of a user interface of a practical implementation via the monitoring system of FIG. 1 for a wireless network.

FIG. 5 is a screenshot of a user interface 100 of a practical implementation via the monitoring system 10 for a wireless network. In FIG. 5, the user interface displays a timeline where an anomaly is selected (e.g., E-UTRAN Radio Access Bearer (ERAB) setup failures). Here, the monitoring system 100 displays information about the approximate periodicity of this anomaly in natural language. On the right side in FIG. 5, examples of the natural language are seen under a "trend" selection. This natural language is useful and meaningful to a user.

Figure 6:
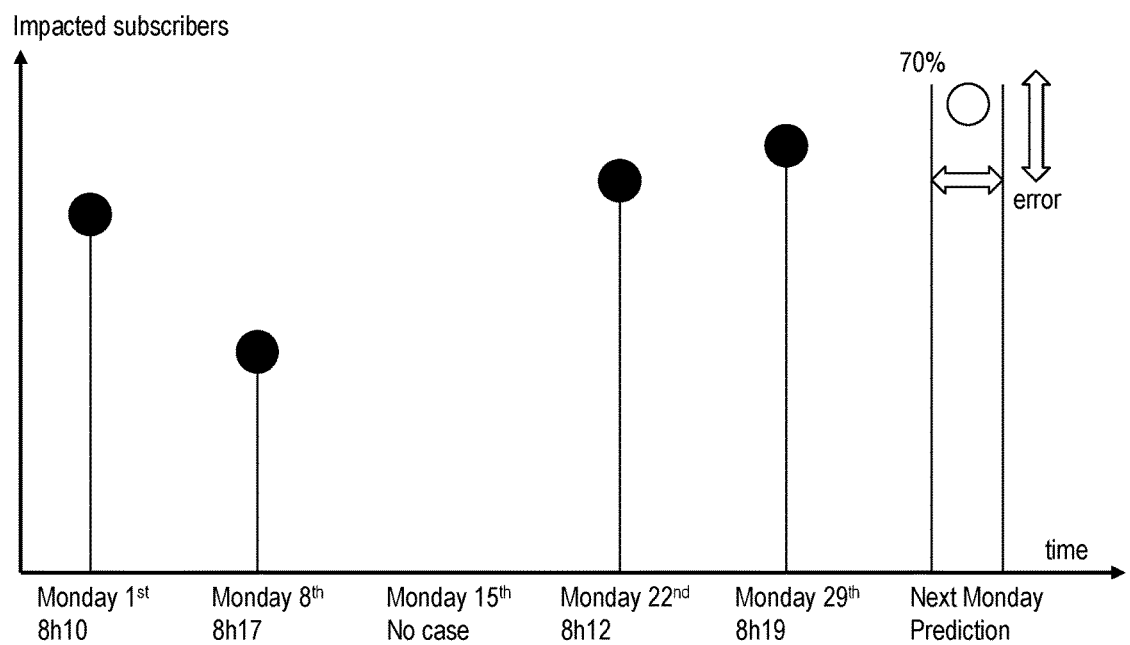
FIG. 6 is a graph of a higher level of periodicity detail showing the periodic trend associated with the evolution of the number of impacted subscribers and the eventual associated predictions, from the user interface.

FIG. 6 is a graph of a higher level of periodicity detail showing the periodic trend associated with the evolution of the number of impacted subscribers and the eventual associated predictions, from the user interface 100. Here, the user interface 100 can display the event, its periodicity, and the x-axis can be the number of subscribers impacted. The value of the periodicity characterization is it may be used for a future prediction that has an occurrence based on the determined periodicity and with an impact that may be characterized based on the impact over time with past occurrences, and with an error range.

Figure 7:
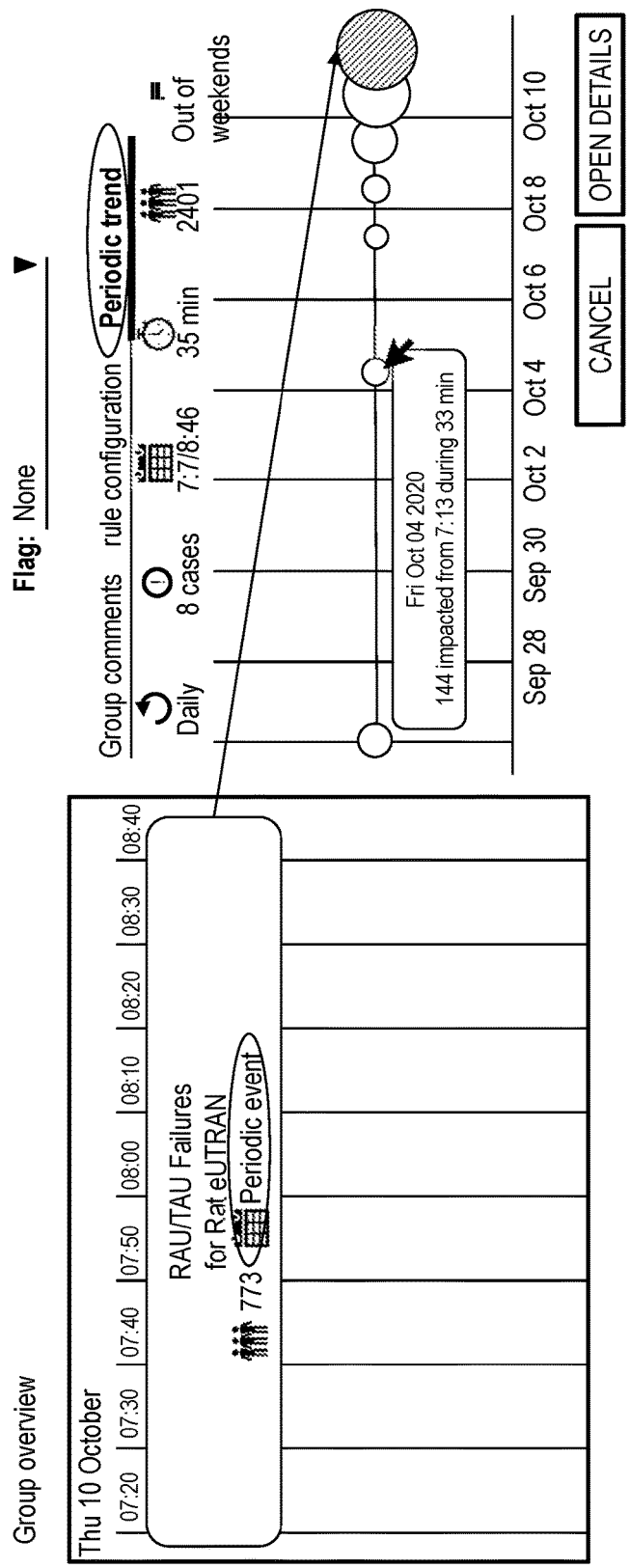
FIG. 7 is a screenshot of another view of the user interface illustrating additional details.

FIG. 7 is a screenshot of another view of the user interface 100 illustrating additional details. On the left side in FIG. 7, an event, e.g., Routing Area Updates (RAU)/Tracking Area Update (TAU) failures for a RAT eUTAN, is displayed on a timeline. Note, the display includes a duration, a number of impacted subscribers, e.g., 773, and an indication the monitoring system 10 has determined this event is periodic, namely a label stating "periodic event" on an interface showing details about events or groups of events. Clicking on the event on the timeline can display periodic trend details on the right side, which provides details on the periodicity. The icon bar at the top provides characterization information. In this example, the characterization information is provided as a series of icons with numbers that provide information about the periodicity. The event has been characterized as occurring daily, except on weekends. Eight cases led to the grouping, with a start time between 7:07 and 8:46 in the morning. They last an average of 35 minutes and affect a total of 2401 subscribers. Alternatively, the average number of subscribers could be shown instead of the total affected subscribers. Other relevant information could also be shown. The graph below shows the sequence of eight cases over time (x-axis). The highlighted circle is the current event. The size of the circles can be proportional to the number of impacted subscribers. This allows a user to identify the event impacts more and more subscribers. A window appears upon the selection of an event of the sequence and provides the details of that particular occurrence.

Figure 8:
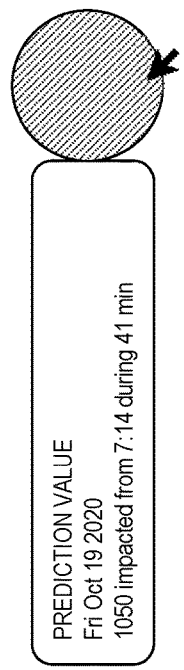
FIG. 8 is a diagram of prediction information after selecting the prediction circle in the timeline.
Figure 9:
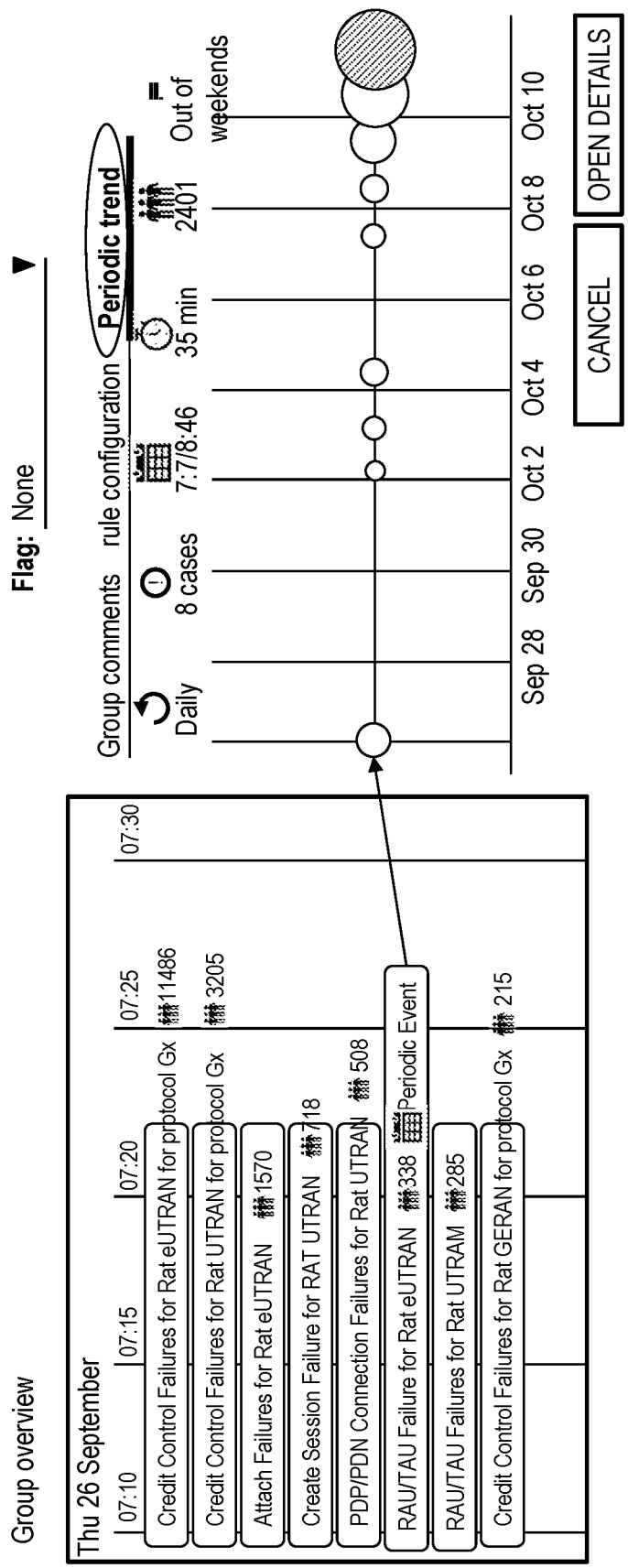
FIG. 9 is a screenshot of the timeline in the user interface with multiple events, including one periodic event.

A circle after the highlighted circle represents a prediction. FIG. 8 is a diagram of prediction information after selecting the prediction circle in the timeline. Clicking on one of the events of the sequence brings the left-hand side group overview window to view for that particular event. FIG. 9 is a screenshot of the timeline in the user interface 100 with multiple events, including one periodic event. This case is correlated with others for root cause and analysis purposes, but only that particular event has shown a periodicity which meets the characterization criteria.

Figure 10:
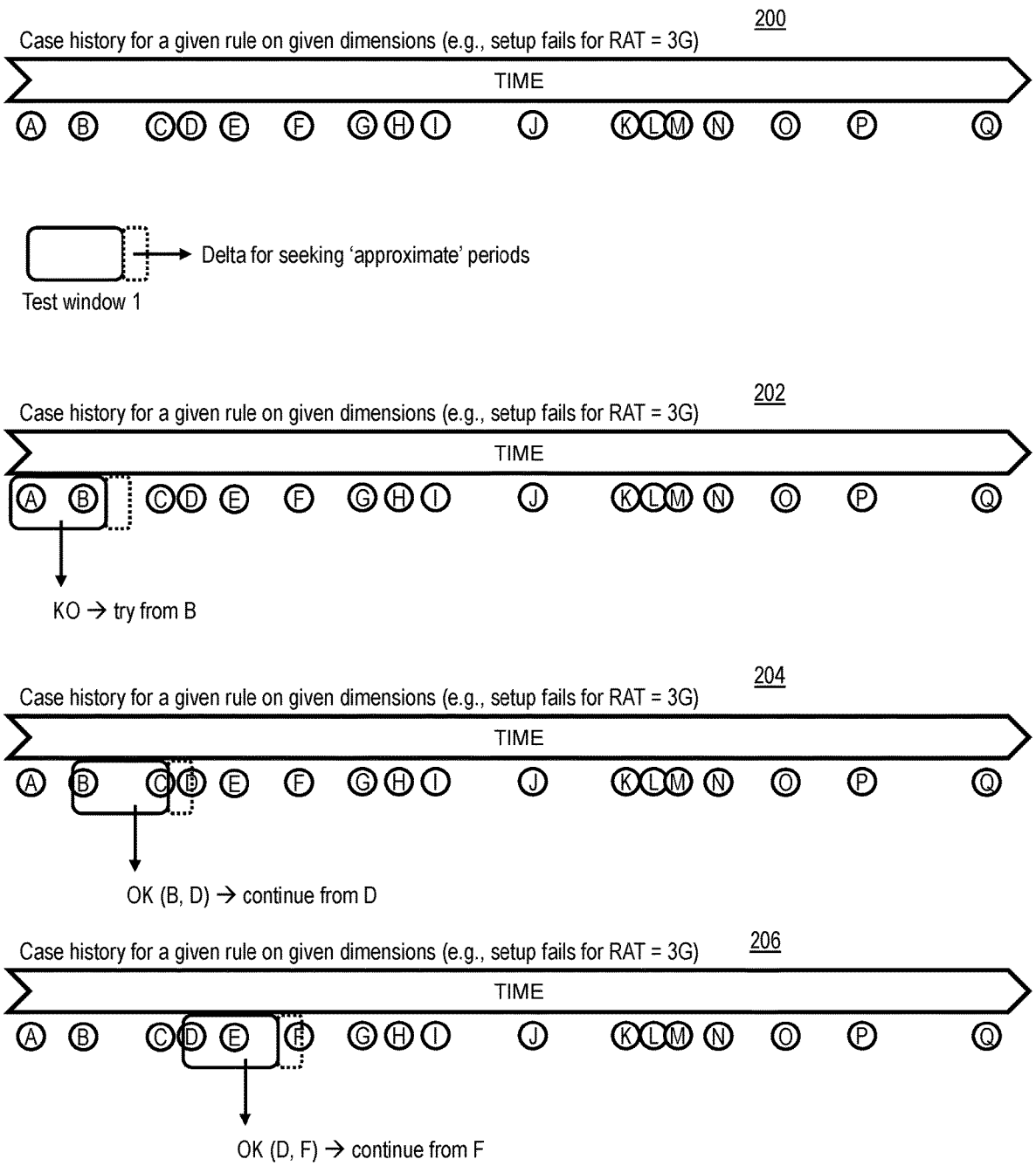
FIGS. 10 and 11 are diagrams illustrating another example implementation of approximate periodicity detection.

FIGS. 10 and 11 are diagrams illustrating another example implementation of approximate periodicity detection. This example includes a set of events over time, with the events labeled A-Q. The events are shown at a step 200. Again, the events are a case history for a given rule on given dimensions. For example, these events could be setup fails for RAT=3G. At the step 200, a test window 1 is selected of a particular size and with a delta extended therefrom also with another size.

In FIG. 10, at step 202, the test window 1 and delta is applied to the events started at the beginning. It is noted that the test window 1 covers A, but there is no event in the delta, so this is a KO and the process continues starting at event B. At step 204, the test window 1 is applied to B and it is noted that event D is in the delta, so OK (B, D) and the process continues from D. At step 206, the test window 1 is applied to D and it is noted that event F is in the delta, so OK (D, F) and the process continues from F.

In FIG. 11, at step 208, the test window 1 is applied to F and it is noted that event H is in the delta, so OK (F, H) and the process continues from H. At step 210, the test window 1 covers H, but there is no event in the delta, so this is a KO and the process stops with a chain B, D, F, H. At step 212, the process can start again with several different test window sizes and different delta sizes. Note that if missing occurrences are allowed by configuration, the process would have continued just as if H had a periodic neighbor, and would have increment a counter of continuous missing occurrences by 1. The number of continuous missing occurrences allowed is defined in configuration. The process will stop if the number of missing occurrences bypasses this parameter. In other case, an item is found, and the process continues. The counter of continuous missing occurrence is set back to 0 for the current chain when a plain item is found.

Missing Occurrences

FIG. 12 is a diagram of a chain of events for illustrating missing occurrences. The present disclosure can support or not that some events are missing in a periodic chain (depends on configuration, i.e., a configured maximal number of continuous missing occurrences). An example chain 220 illustrates two discontinuous missing occurrences (shown as a dotted circle). An example chain 222 illustrates five missing occurrences with three continuous missing occurrences at the end. For the chain 222 example, the analysis of plain events sequences versus 'missing events sequences' (how often, how many continuous) is interesting, to see if can show a kind of pattern (see periodic recurrence pattern recognition) that would be helpful for prediction.

Periodic Recurrence Pattern Recognition

When periodic chains are discontinuous due to a sublayer analysis finding several discontinuous chains of periodic events with the same period or a chain of events having several missing occurrences, it is important to try to understand if the sequences between continuous events and continuous 'missing' occurrences show a pattern. Thanks to this knowledge, the predictions of next events would be more accurate, taking into account an eventual miss of an occurrence as a next value.

For example, the following illustrate sequences that would lead to pattern recognition where X is an event occurrence in the chain and 0 is a missing occurrence in the chain:

XXX0XXX0XXX0X

This is a pattern: three occurrences, then one missing, etc. So that it is possible to predict a next occurrence as (X).

In another example,

XX00XXX00XX00XXX00XX00XXX

This is a pattern: two occurrences, then one missing, three occurrences then one missing, etc. So, it is possible to predict the missing occurrence as missing (0). Of course, a pattern may not always exist in the sequence.

The pattern recognition can use different techniques, such as brute force auto-correlation on the chain (using different windows sizes), or creating a bank of standard patterns and comparing incoming chains structure.

A pattern match may have a score of matching (e.g., 95%) if matches bypass a certain % then it can be considered as a full match. This would lead to deduce the next value plain occurrence for prediction, avoiding missing occurrences.

Machine Learning

For Prediction, an alternative would be to use a ML algorithm called CPT+Performing sequence prediction (CPT+(Compact Prediction Tree+) is a sequence prediction model. It is used for performing sequence predictions. A sequence prediction includes predicting the next symbol of a sequence based on a set of training sequences. The task of sequence prediction has numerous applications in various domains. For example, it can be used to predict the next webpage that a user will visit based on previously visited webpages by the user and other users.) It would use the sequences XXX0XX . . . . As symbols to learn and predict a next value (e.g., set 1 for (event) and 0 for (missing event).

Example Server Architecture

Figure 13:
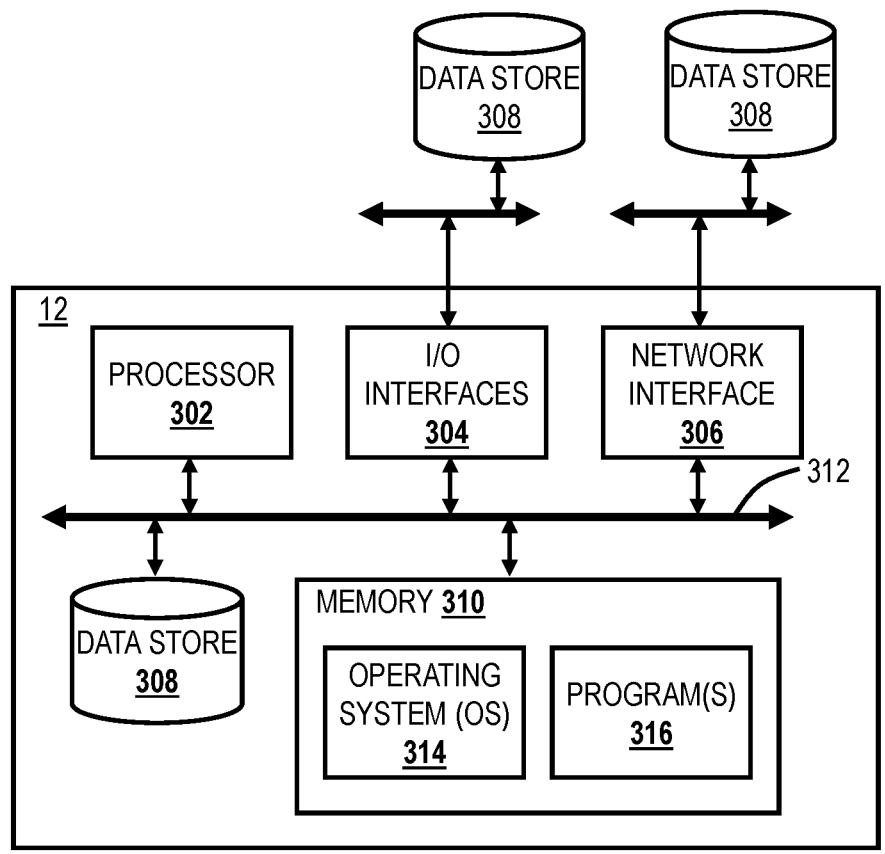
FIG. 13 is a block diagram of a server, which may be used in to implement the monitoring system.

FIG. 13 is a block diagram of a server 12, which may be used to implement the monitoring system 10. The server 12 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 13 depicts the server 12 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 12, a semiconductor-based microprocessor (in the form of a microchip or chipset), or generally any device for executing software instructions. When the server 12 is in operation, the processor 302 is configured to execute software stored within the memory 310, to communicate data to and from the memory 310, and to generally control operations of the server 12 pursuant to the software instructions. The I/O interfaces 304 may be used to receive user input from and/or for providing system output to one or more devices or components. The user input may be provided via, for example, a keyboard, touchpad, and/or a mouse. System output may be provided via a display device and a printer (not shown). I/O interfaces 304 may include, for example, a serial port, a parallel port, a Small Computer System Interface (SCSI), a Serial ATA (SATA), a fiber channel, InfiniBand, iSCSI, a PCI Express interface (PCI-x), an Infrared (IR) interface, a Radio Frequency (RF) interface, a Universal Serial Bus (USB) interface, or the like.

The network interface 306 may be used to enable the server 12 to communicate over the network 120, etc. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the server 12, such as, for example, an internal hard drive connected to the local interface 312 in the server 12. Additionally, in another embodiment, the data store 308 may be located external to the server 12 such as, for example, an external hard drive connected to the I/O interfaces 304 (e.g., SCSI or USB connection). In a further embodiment, the data store 308 may be connected to the server 12 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein, such as with respect to the monitoring system 10.

Example User Device Architecture

Figure 14:
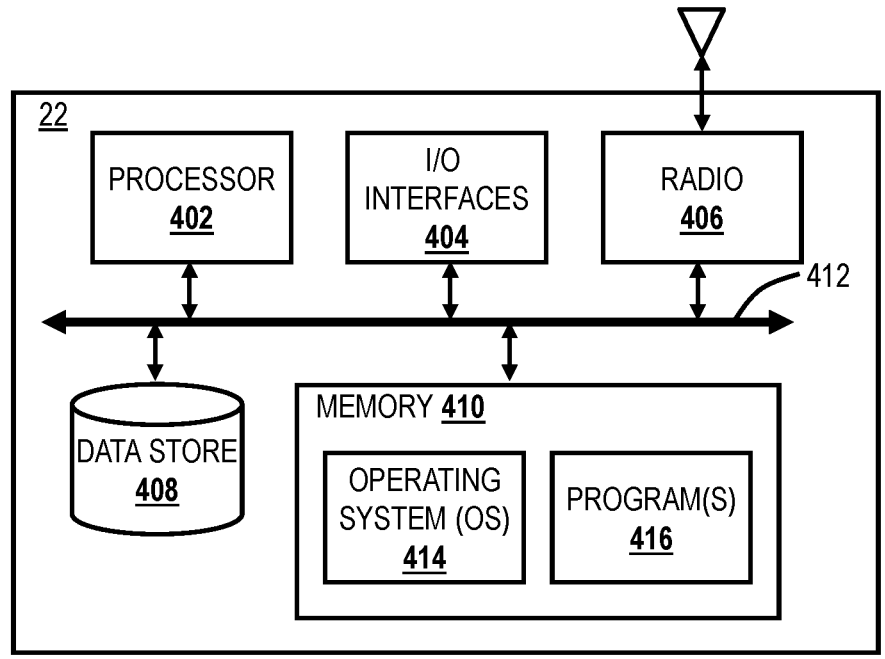
FIG. 14 is a block diagram of a user device, which may connect to the monitoring system.

FIG. 14 is a block diagram of a user device 22, which may connect to the monitoring system 10. The user device 22 can be a digital device that, in terms of hardware architecture, generally includes a processor 402, input/output (I/O) interfaces 404, a radio 406, a data store 408, and memory 410. It should be appreciated by those of ordinary skill in the art that FIG. 14 depicts the user device 22 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the user device 22, a semiconductor-based microprocessor (in the form of a microchip or chipset), or generally any device for executing software instructions. When the user device 22 is in operation, the processor 402 is configured to execute software stored within the memory 410, to communicate data to and from the memory 410, and to generally control operations of the user device 22 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like. The I/O interfaces 404 can include a graphical user interface (GUI) that enables a user to interact with the user device 22.

The radio 406 enables wireless communication to an external access device or network. Any number of suitable wireless data communication protocols, techniques, or methodologies can be supported by the radio 406, including, without limitation: Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); wireless telecommunication protocols (e.g., 3G/4G/5G, etc.); and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 14, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end-user functionality with the user device 22. For example, example programs 416 may include a web browser to connect with the server 12 for displaying a GUI related to the monitoring system 10, a dedicated application for displaying a GUI related to the monitoring system 10, and the like.

Process

Figure 15:
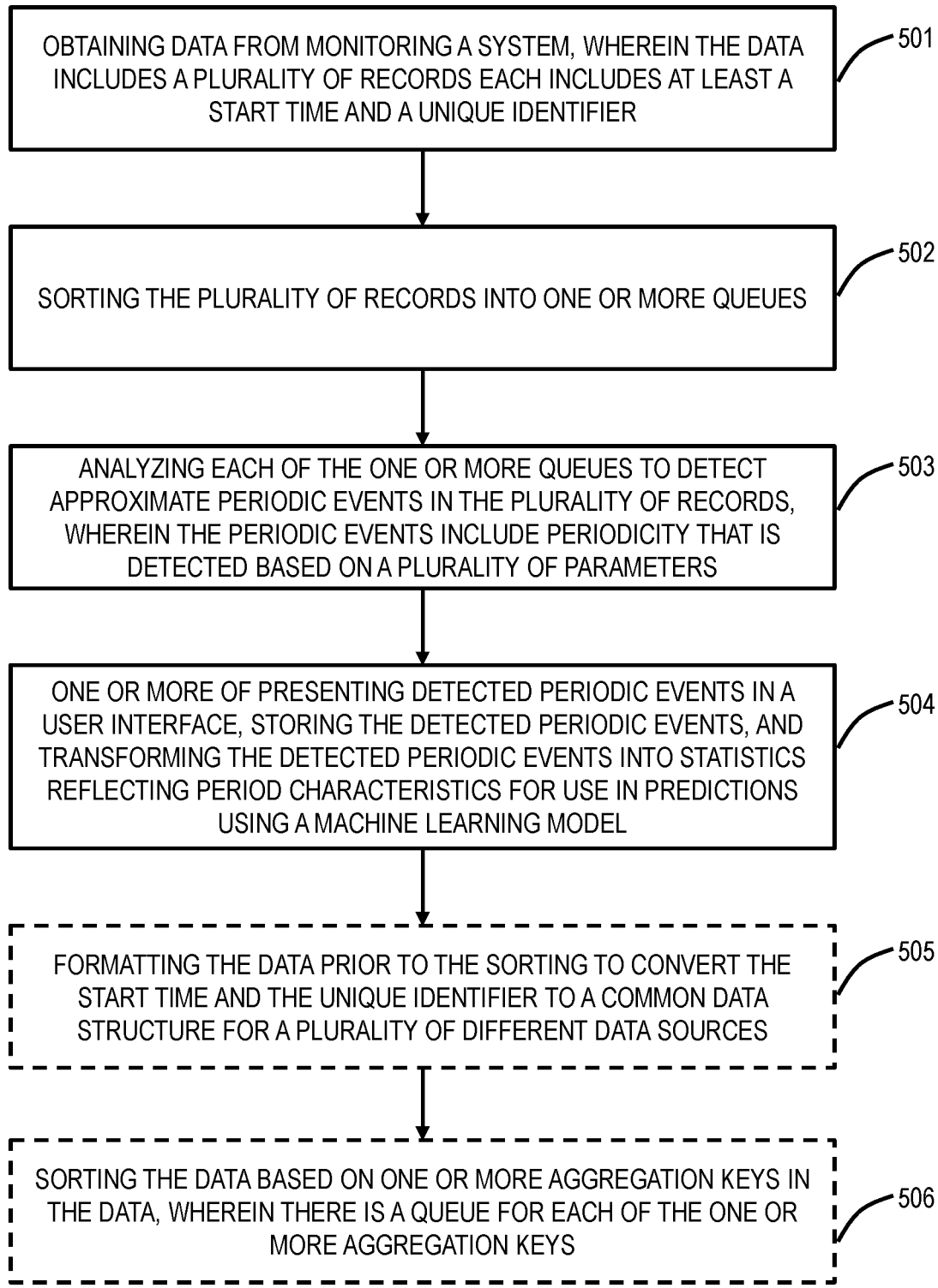
FIG. 15 is a flowchart of a process for detection, characterization, and prediction of real-time events having approximate periodicity.

FIG. 15 is a flowchart of a process 500 for detection, characterization, and prediction of real-time events having approximate periodicity. The process 500 can be implemented as a method including steps, an apparatus with one or more processors configured to implement the steps, and as a non-transitory computer-readable medium having instructions stored thereon for programming a device to perform the steps.

The steps include obtaining data from monitoring a system, wherein the data includes a plurality of records each includes at least a start time and a unique identifier (step 501); sorting the plurality of records into one or more queues (step 502); analyzing each of the one or more queues to detect approximate periodic events in the plurality of records, wherein the periodic events include periodicity that is detected based on a plurality of parameters (step 503); and one or more of presenting detected periodic events in a user interface, storing the detected periodic events, and transforming the detected periodic events into statistics reflecting period characteristics for use in predictions using a machine learning model (step 504).

The steps can include formatting the data prior to the sorting to convert the start time and the unique identifier to a common data structure for a plurality of different data sources (step 505). The formatting can further include including specific domain information in the common data structure, wherein the specific domain information includes any of impacted subscribers, duration, and root cause diagnosis. The steps can include sorting the data based on one or more aggregation keys in the data, wherein there is a queue for each of the one or more aggregation keys (step 506).

The plurality of parameters can include a history depth that defines how far back in time of the data, a sensitivity that is a range of time for establishing periodicity, and a minimal chain size that defines how many consecutive occurrences are required to detect periodic events. The sensitivity can be defined in minutes, and wherein the minimal chain size is at least three. The plurality of parameters can further include a time aggregation interval. The data can be from a network or from financial transactions.

The machine learning model can be trained via supervised learning using tree learning and approximate period statistics used for learning include any of period precision, a number of consecutive items in period chains, events noise ratio, event duration, and a number of impacted sub scribers.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a device to perform steps of:
    obtaining data from monitoring a system, wherein the data includes a plurality of records each includes at least a start time and a unique identifier;
    sorting the plurality of records into one or more queues;
    analyzing each of the one or more queues to detect approximate periodic chains of events in the plurality of records, wherein the periodic chains of events include periodicity that is detected based on a plurality of parameters including some missing occurrences therein, wherein the plurality of parameters include a history depth that defines how far back in time of the data, a sensitivity that is a range of time for establishing periodicity, a minimal chain size that defines how many consecutive occurrences are required to detect the periodic chains of events, and a number of consecutive missing occurrences allowed; and
    one or more of presenting detected periodic chains of events in a user interface, storing the detected periodic events, and transforming the detected periodic chains of events into statistics reflecting period characteristics for use in predictions using a machine learning model.

2. The non-transitory computer-readable medium of claim 1, wherein the steps further include
    formatting the data prior to the sorting to convert the start time and the unique identifier to a common data structure for a plurality of different data sources.

3. The non-transitory computer-readable medium of claim 2, wherein the formatting further includes specific domain information in the common data structure, wherein the specific domain information includes any of impacted subscribers, duration, and root cause diagnosis.

4. The non-transitory computer-readable medium of claim 1, wherein the steps further include
    sorting the data based on one or more aggregation keys in the data, wherein there is a queue for each of the one or more aggregation keys.

5. The non-transitory computer-readable medium of claim 1, wherein the sensitivity is defined in minutes, and wherein the minimal chain size is at least three.

6. The non-transitory computer-readable medium of claim 1, wherein the number of consecutive missing occurrences allowed is between 0 and 3.

7. The non-transitory computer-readable medium of claim 1, wherein the steps further include
    utilizing sequence prediction or auto-correlation on periodic chains of events with missing occurrences to identify patterns.

8. The non-transitory computer-readable medium of claim 1, wherein the machine learning model is trained via supervised learning using tree learning and approximate period statistics used for learning include any of period precision, a number of consecutive items in period chains, events noise ratio, event duration, and a number of impacted subscribers.

9. A method comprising:
    obtaining data from monitoring a system, wherein the data includes a plurality of records each includes at least a start time and a unique identifier;
    sorting the plurality of records into one or more queues;
    analyzing each of the one or more queues to detect approximate periodic chains of events in the plurality of records, wherein the periodic chains of events include periodicity that is detected based on a plurality of parameters including some missing occurrences therein, wherein the plurality of parameters include a history depth that defines how far back in time of the data, a sensitivity that is a range of time for establishing periodicity, a minimal chain size that defines how many occurrences are required to detect periodic chains of events, and a number of consecutive missing occurrences allowed; and one or more of presenting detected periodic chains of events in a user interface, storing the detected periodic chains of events, and transforming the detected periodic chains of events into statistics reflecting period characteristics for use in predictions using a machine learning model.

10. The method of claim 9, further comprising
formatting the data prior to the sorting to convert the start time and the unique identifier to a common data structure for a plurality of different data sources.

11. The method of claim 9, further comprising
sorting the data based on one or more aggregation keys in the data, wherein there is a queue for each of the one or more aggregation keys.

12. The method of claim 9, wherein the sensitivity is defined in minutes, and wherein the minimal chain size is at least three and wherein the number of consecutive missing occurrences allowed is between 0 and 3.

13. The method of claim 9, further comprising
utilizing sequence prediction or auto-correlation on periodic chains of events with missing occurrences to identify patterns.

14. The method of claim 9, wherein the machine learning model is trained via supervised learning using tree learning and approximate period statistics used for learning include any of period precision, a number of consecutive items in period chains, events noise ratio, event duration, and a number of impacted subscribers.

15. An apparatus comprising:
at least one processor and memory storing instructions that, when executed, cause the at least one processor to
obtain data from monitoring a system, wherein the data includes a plurality of records each includes at least a start time and a unique identifier;
sort the plurality of records into one or more queues;
analyze each of the one or more queues to detect approximate periodic chains of events in the plurality of records, wherein the periodic chains of events include periodicity that is detected based on a plurality of parameters, wherein the plurality of parameters include a history depth that defines how far back in time of the data, a sensitivity that is a range of time for establishing periodicity, and a minimal chain size that defines how many occurrences are required to detect periodic chains of events; and
one or more of present detected periodic chains of events in a user interface, store the detected periodic chains of events, transform the detected periodic chains of events into statistics reflecting period characteristics for use in predictions using a machine learning model.

16. The apparatus of claim 15, wherein the instructions that, when executed, cause the at least one processor to
format the data prior to the sorting to convert the start time and the unique identifier to a common data structure for a plurality of different data sources.

17. The apparatus of claim 15, wherein the instructions that, when executed, cause the at least one processor to
sorting the data based on one or more aggregation keys in the data, wherein there is a queue for each of the one or more aggregation keys.

* * * * *